US011849100B2

(12) United States Patent
Aiba et al.

(10) Patent No.: US 11,849,100 B2
(45) Date of Patent: Dec. 19, 2023

(54) INFORMATION PROCESSING APPARATUS, CONTROL METHOD, AND NON-TRANSITORY COMPUTER READABLE MEDIUM

(71) Applicant: CANON KABUSHIKI KAISHA, Tokyo (JP)

(72) Inventors: Toshitaka Aiba, Tokyo (JP); Toru Kobayashi, Tokyo (JP); Shuhei Iino, Kanagawa (JP); Takumi Uehara, Kanagawa (JP); Atsuto Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/825,730

(22) Filed: May 26, 2022

(65) Prior Publication Data

US 2022/0385882 A1    Dec. 1, 2022

(30) Foreign Application Priority Data

May 31, 2021   (JP) .................................. 2021-090861
Mar. 7, 2022   (JP) .................................. 2022-034311

(51) Int. Cl.
*H04N 13/246*        (2018.01)
*H04N 13/156*        (2018.01)
(Continued)

(52) U.S. Cl.
CPC ......... *H04N 13/246* (2018.05); *H04N 13/156* (2018.05); *H04N 13/178* (2018.05); *H04N 13/232* (2018.05)

(58) Field of Classification Search
CPC .. H04N 13/246; H04N 13/156; H04N 13/178; H04N 13/232; H04N 13/207; H04N 13/218; H04N 23/63; H04N 13/189
(Continued)

(56) References Cited

U.S. PATENT DOCUMENTS 3,608,458 A    9/1971   Ratliff, Jr.
9,654,768 B2 *  5/2017  Qin ..................... H04N 13/398
(Continued)

FOREIGN PATENT DOCUMENTS

EP         2180716 A1 *  4/2010    ......... H04N 13/0477
JP         2013141052 A   7/2013

*Primary Examiner* — Tung T Vo
(74) *Attorney, Agent, or Firm* — CANON U.S.A., INC. IP Division

(57) ABSTRACT

An information processing apparatus includes: a processor; and a memory storing a program which, when executed by the processor, causes the information processing apparatus to obtain an image and correction information on a first optical system and a second optical system, the image including a first area corresponding to a first image inputted via the first optical system and a second area corresponding to a second image inputted via the second optical system having a predetermined parallax with respect to the first optical system; execute correcting processing of correcting, based on the correction information, positions of a pixel included in the first area and a pixel included in the second area in the image, and generate a processed image by executing processing of transforming the corrected first area and the corrected second area.

16 Claims, 17 Drawing Sheets

(51) Int. Cl.
*H04N 13/178* (2018.01)
*H04N 13/232* (2018.01)

(58) Field of Classification Search
USPC .......................................................... 348/49
See application file for complete search history.

(56) References Cited

U.S. PATENT DOCUMENTS

| | | | |
|---|---|---|---|
| 11,523,054 B2* | 12/2022 | Park | G06T 5/50 |
| 2011/0141230 A1* | 6/2011 | Bai | H04N 13/106 |
| | | | 348/54 |
| 2013/0120524 A1* | 5/2013 | Zheng | G06V 20/56 |
| | | | 348/36 |
| 2013/0208081 A1* | 8/2013 | Xiong | G06T 7/85 |
| | | | 348/E5.051 |
| 2013/0250065 A1* | 9/2013 | Aoki | H04N 13/128 |
| | | | 348/46 |
| 2018/0070070 A1* | 3/2018 | Ho | H04N 13/111 |
| 2019/0025544 A1* | 1/2019 | Watanabe | G02B 7/36 |
| 2019/0058870 A1* | 2/2019 | Rowell | H04N 13/189 |
| 2021/0321079 A1* | 10/2021 | Shimizu | H04N 13/239 |

* cited by examiner

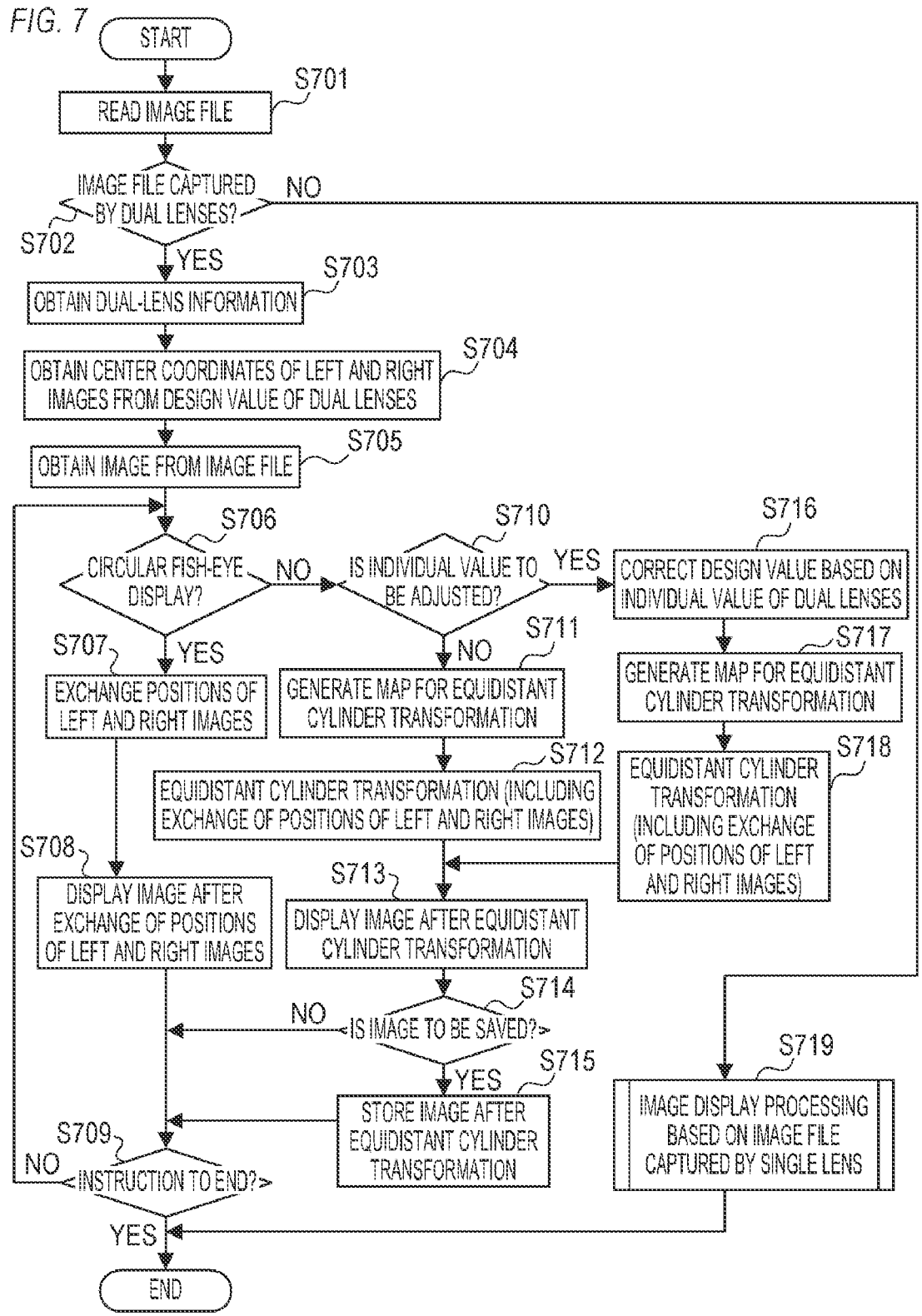

FIG. 10A

| LENS DESIGN VALUE |
|---|
| LENS INDIVIDUAL VALUE |
| LENS FLAG |
| LENS FOCAL LENGTH |
| LENS TEMPERATURE |

FIG. 10B

| | |
|---|---|
| LENS DESIGN VALUE | IMAGE CIRCLE POSITION |
| | IMAGE CIRCLE DIAMETER |
| | ANGLE OF VIEW |
| | DISTORTION CORRECTION COEFFICIENT |
| LENS INDIVIDUAL VALUE | IMAGE CIRCLE DISPLACEMENT |
| | OPTICAL AXIS INCLINATION |
| | IMAGE MAGNIFICATION DEVIATION |

FIG. 10C

| CAMERA RECORDING AREA INFORMATION |
|---|
| INTRA-CAMERA ACCELEROMETER INFORMATION |
| RIGHT EXPOSURE CORRECTION INFORMATION |

INFORMATION PROCESSING APPARATUS, CONTROL METHOD, AND NON-TRANSITORY COMPUTER READABLE MEDIUM

BACKGROUND

Technical Field

The present disclosure relates to an information processing apparatus, a control method, and a non-transitory computer readable medium.

Description of the Related Art

In known techniques, two images with a parallax are captured by two cameras and are stereoscopically displayed. Japanese Patent Application Publication No. 2013-141052 discloses a camera that includes a lens unit having two optical systems and can capture two images with a parallax at a time.

However, when an image (an image including two images with a parallax) captured with a lens unit having two optical systems is displayed like a conventional image, the positional relationship between the two optical systems and the positional relationship between the two images in the image are reversed from each other.

SUMMARY

An information processing apparatus includes: a processor; and a memory storing a program which, when executed by the processor, causes the information processing apparatus to obtain an image and correction information on a first optical system and a second optical system, the image including a first area corresponding to a first image inputted via the first optical system and a second area corresponding to a second image inputted via the second optical system having a predetermined parallax with respect to the first optical system; execute correcting processing of correcting, based on the correction information, positions of a pixel included in the first area and a pixel included in the second area in the image, and generate a processed image by executing processing of transforming the corrected first area and the corrected second area.

Further features of the present disclosure will become apparent from the following description of exemplary embodiments with reference to the attached drawings.

BRIEF DESCRIPTION OF THE DRAWINGS

FIG. 7 is a flowchart indicating the operations of the PC.

FIG. 10A is a schematic diagram indicating lens information, FIG. 10B is a schematic diagram indicating a lens design value and a lens individual value, and FIG. 10C is a schematic diagram indicating camera information.

DESCRIPTION OF THE EMBODIMENTS

An embodiment of the present disclosure will be described in detail with reference to the accompanying drawings.

First Embodiment

Figure 1A:
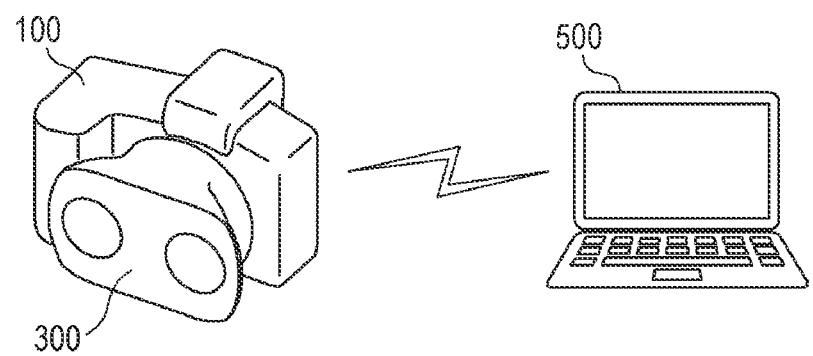
FIGS. 1A and 1B are schematic diagrams illustrating the overall configuration of a system.
Figure 1B:
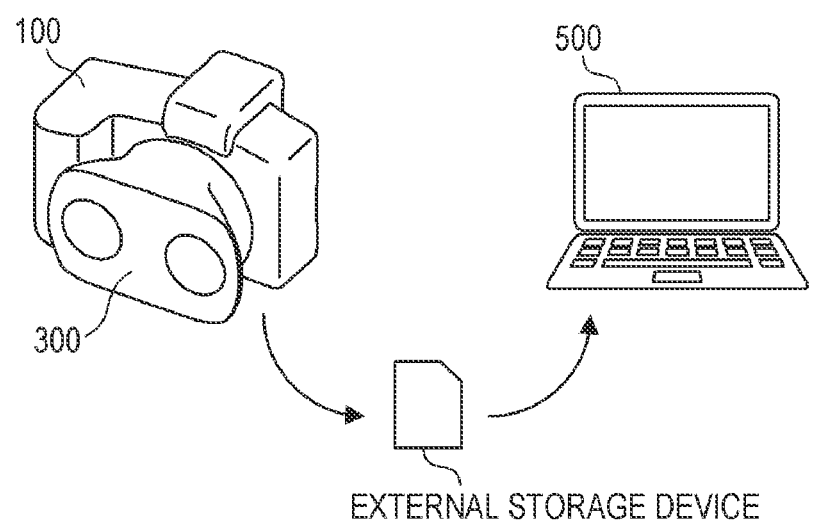

A first embodiment of the present disclosure will be described below. FIGS. 1A and 1B are schematic diagrams illustrating an example of the overall configuration of a system according to the present embodiment. The system according to the present embodiment includes a digital camera (camera) 100 and a personal computer (PC) 500. To the camera 100, a lens unit 300 is attached (connected). The lens unit 300 will be specifically described later. The attachment of the lens unit 300 allows the camera 100 to capture two images (still images or moving images) at a time with a predetermined parallax. The PC 500 is an information processing apparatus that handles images captured by imaging apparatuses such as the camera 100. FIG. 1A illustrates a configuration in which the camera 100 and the PC 500 are connected to communicate with each other via radio or wire communications. FIG. 1B illustrates a configuration in which an image or the like captured by the camera 100 is inputted basically as a file to the PC 500 via an external storage device. The external storage device may be connected to or does not need to be connected to both of the camera 100 and the PC 500. For example, the external storage device may be connected to the camera 100, and a file of images captured by the camera 100 may be stored in the external storage device. Thereafter, the external storage device may be detached from the camera 100 and connected to the PC 500, and the file stored in the external storage device may be imported into the PC 500.

Figure 2A:
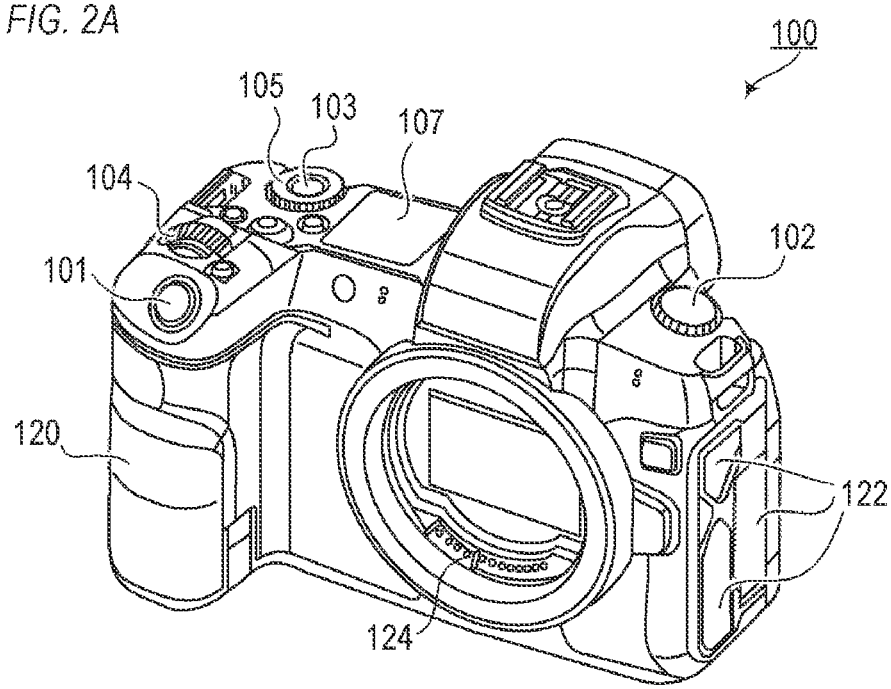
FIGS. 2A and 2B are outside drawings illustrating a camera.
Figure 2B:
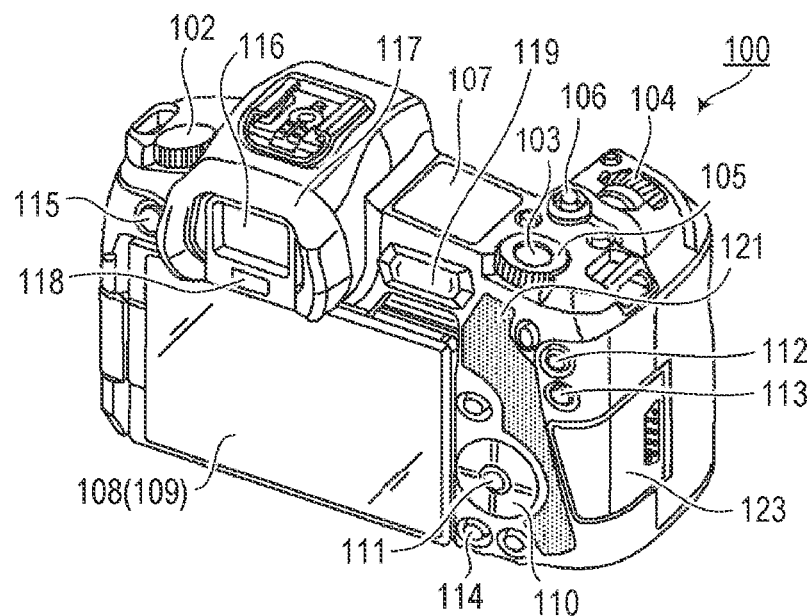

FIGS. 2A and 2B are outside drawings illustrating an example of the appearance of the camera 100. FIG. 2A is a perspective view of the camera 100 viewed from the front side. FIG. 2B is a perspective view of the camera 100 viewed from the back side.

The camera 100 includes, on the top surface, a shutter button 101, a power switch 102, a mode-change switch 103, a main electronic dial 104, a sub electronic dial 105, a moving-image button 106, and a finder-outside display unit 107. The shutter button 101 is an operation member for providing a shooting preparation instruction or a shooting instruction. The power switch 102 is an operation member for turning on or off the power of the camera 100. The mode-change switch 103 is an operation member for switching various modes. The main electronic dial 104 is a rotary operation member for changing set values such as a shutter speed and an aperture. The sub electronic dial 105 is a rotary operation member for moving a selection frame (cursor) or switching images. The moving-image button 106 is an operation member for providing an instruction to start or stop shooting (recording) a moving image. The finder-outside display unit 107 displays various set values such as a shutter speed and an aperture.

The camera 100 includes, on the back side, a display unit 108, a touch panel 109, a direction key 110, a SET button 111, an AE lock button 112, a zoom-in button 113, a playback button 114, and a menu button 115, an eyepiece part 116, an eyepiece detection unit 118, and a touch bar 119. The display unit 108 displays images and various information. The touch panel 109 is an operation member for detecting a touch on the display screen (touch screen) of the display unit 108. The direction key 110 is an operation member including a key that can be pressed up and down, left and right (cross key). Processing can be performed according to the pressing position of the direction key 110. The SET button 111 is an operation member to be pressed mainly when a selected item is determined. The AE lock button 112 is an operation member to be pressed when an exposed state is fixed in a shooting standby state. The zoom-in button 113 is an operation member for switching on or off a zoom-in mode in the live view display (LV display) of a shooting mode. When the zoom-in mode is switched on, the main electronic dial 104 is operated so as to zoom in or out a live view image (LV image). The zoom-in button 113 is used when a played back image is enlarged or a magnification is increased in a playback mode. The playback button 114 is an operation member for switching the shooting mode and the playback mode. By pressing the playback button 114 in the shooting mode, the mode shifts to the playback mode, so that the latest one of images recorded in a recording medium 227, which will be described later, can be displayed on the display unit 108.

The menu button 115 is an operation member to be pressed for displaying a menu screen, which enables various settings, on the display unit 108. A user can intuitively make various settings by using the menu screen displayed on the display unit 108, the direction key 110, and the SET button 111. The eyepiece part 116 is a part for looking at an eye level though an eyepiece finder (eye-level finder) 117. The user can visually confirm video displayed on an electronic view finder (EVF) 217, which will be described later, in the camera 100 through the eyepiece part 116. The eyepiece detection unit 118 is a sensor for detecting whether an eye of the user is placed near the eyepiece part 116 (eyepiece finder 117).

The touch bar 119 is a linear touching member (line touch sensor) that can receive a touch. The touch bar 119 is located so as to be touched (touchable) with the right thumb while a grip part 120 is held with the right hand (gripped with the little finger, the ring finger, and the middle finger of the right hand) so as to press the shutter button 101 with the index finger of the right hand. In other words, the touch bar 119 can be operated when the user looks into the eyepiece part 116 with the eyepiece finder 117 placed at eye level and holds the camera in a position (shooting position) that allows the shutter button 101 to be pressed at any time. The touch bar 119 can receive, for example, a tapping operation (touch and release in a predetermined period without moving the touching position) and a sliding operation to the left and right (touch and move the touching position while keeping the touch) on the touch bar 119. The touch bar 119 is an operation member different from the touch panel 109 and does not have a display function. The touch bar 119 acts as, for example, a multi-function bar (M-Fn bar) where various functions can be allocated.

The camera 100 further includes the grip part 120, a thumb rest part 121, a terminal cover 122, a lid 123, and a communication terminal 124. The grip part 120 is a holding part having a shape that is easy to hold with the right hand of the user who holds the camera 100. While the camera 100 is held with the grip part 120 gripped with the little finger, the ring finger, and the middle finger of the right hand, the shutter button 101 and the main electronic dial 104 are located so as to be operated with the right index finger. In the same state, the sub electronic dial 105 and the touch bar 119 are located so as to be operated with the right index finger. The thumb rest part 121 (thumb standby position) is a grip part provided at a point where the right thumb holding the grip part 120 is easily placed without operating any of the operation members on the back side of the camera 100. The thumb rest part 121 includes a rubber member for increasing holding power (a sense of gripping). The terminal cover 122 protects a connector, e.g., a connection cable that connects the camera 100 to external equipment (external device). The lid 123 closes a slot for storing the recording medium 227, which will be described later, so that the recording medium 227 and the slot are protected. The communication terminal 124 is a terminal for communicating with a lens unit (e.g., a lens unit 200 or the lens unit 300, which will be described later) detachable from the camera 100.

Figure 3:
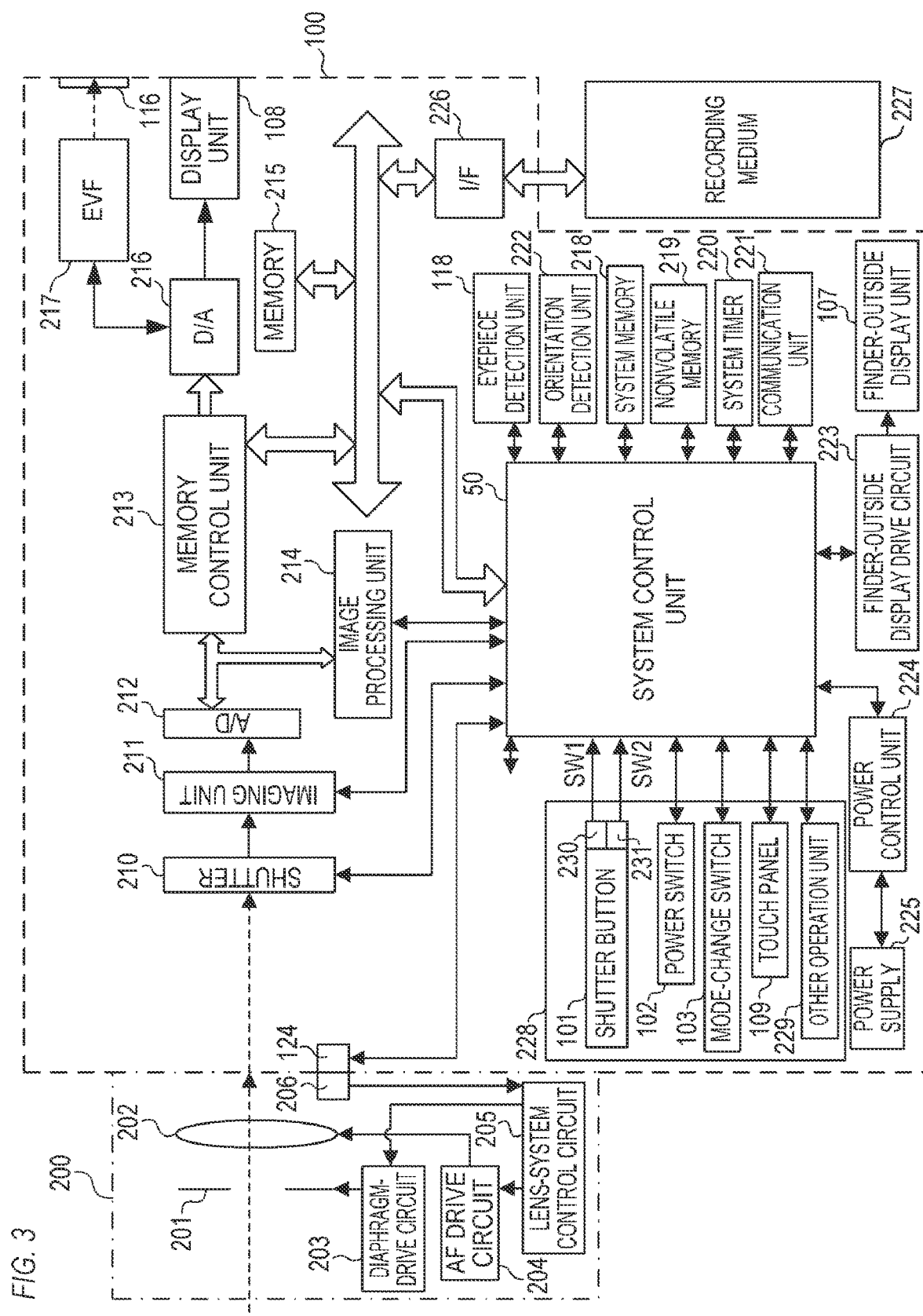
FIG. 3 is a block diagram illustrating the configuration of the camera.

FIG. 3 is a block diagram illustrating an example of the configuration of the camera 100. The same constituent elements as those of FIGS. 2A and 2B are indicated by the same reference numerals as in FIGS. 2A and 2B, and an explanation thereof is optionally omitted. In FIG. 3, the lens unit 200 is attached to the camera 100.

The lens unit 200 will be first described below. The lens unit 200 is a kind of interchangeable lens detachable from the camera 100. The lens unit 200 is a single lens, an example of a typical lens. The lens unit 200 includes a diaphragm 201, a lens 202, a diaphragm-drive circuit 203, an autofocus (AF) drive circuit 204, a lens-system control circuit 205, and a communication terminal 206.

The diaphragm 201 is configured with an adjustable aperture diameter. The lens 202 includes a plurality of lenses. The diaphragm-drive circuit 203 adjusts an amount of light by controlling the aperture diameter of the diaphragm 201. The AF drive circuit 204 adjusts the focus by driving the lens 202. The lens-system control circuit 205 controls the diaphragm-drive circuit 203 and the AF drive circuit 204 based on an instruction of a system control unit 50, which will be described later. The lens-system control circuit 205 controls the diaphragm 201 via the diaphragm-drive circuit 203 and adjusts the focus by changing the position of the lens 202 via the AF drive circuit 204. The lens-system control circuit 205 can communicate with the camera 100. Specifically, the communications are conducted through the communication terminal 206 of the lens unit 200 and the communication terminal 124 of the camera 100. The communication terminal 206 is a terminal that allows the lens unit 200 to communicate with the camera 100.

The camera 100 will be described below. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal-plane shutter capable of freely controlling the exposure time of the imaging unit 211 based on an instruction of the system control unit 50. The imaging unit 211 is an image pickup device (image sensor) including a CCD and a CMOS device that convert an optical image into an electric signal. The imaging unit 211 may include an imaging-area phase-difference sensor for outputting defocus-amount information to the system control unit 50. The A/D converter 212 converts an analog signal, which is outputted from the imaging unit 211, into a digital signal. The image processing unit 214 performs predetermined processing (including pixel interpolation, resizing such as size reduction, and color conversion) on data from the A/D converter 212 or data from the memory control unit 213. Moreover, the image processing unit 214 performs predetermined arithmetic processing by using captured image data, and then the system control unit 50 performs exposure control and distance-measurement control based on the obtained processing result. This processing enables, for example, through-the-lens (TTL) AF processing, autoexposure (AE) processing, flash pre-emission (EF) processing. Furthermore, the image processing unit 214 performs the predetermined arithmetic processing by using the captured image data, and then the system control unit 50 performs TTL auto white balance (AWB) processing based on the obtained processing result.

Image data from the A/D converter 212 is written into the memory 215 through the image processing unit 214 and the memory control unit 213. Alternatively, image data from the A/D converter 212 is written into the memory 215 through the memory control unit 213 without the image processing unit 214. The memory 215 stores image data that is obtained by the imaging unit 211 and is converted into digital data by the A/D converter 212 and image data to be displayed on the display unit 108 and the EVF 217. The memory 215 has a storage capacity that is large enough to store a predetermined number of still images and moving images and voice in a predetermined time. Moreover, the memory 215 acts as an image display memory (video memory).

The D/A converter 216 converts image data, which is to be displayed and is stored in the memory 215, into an analog signal and supplies the signal to the display unit 108 and the EVF 217. Thus, the image data that is to be displayed and is written into the memory 215 is displayed on the display unit 108 and the EVF 217 via the D/A converter 216. The display unit 108 and the EVF 217 provide display in response to the analog signal from the D/A converter 216. The display unit 108 and the EVF 217 are, for example, LCDs or organic EL displays. Digital signals that are converted by the A/D converter 212 and are stored in the memory 215 are converted into analog signals by the D/A converter 216, are sequentially transferred to the display unit 108 and the EVF 217, and are displayed thereon, thereby providing live view display.

The system control unit 50 is a control unit including at least one processor and/or at least one circuit. In other words, the system control unit 50 may be a processor, a circuit, or a combination of a processor and a circuit. The system control unit 50 controls the overall camera 100. The system control unit 50 implements the processing of flowcharts, which will be described later, by running programs recorded in a nonvolatile memory 219. Moreover, the system control unit 50 performs display control by controlling, for example, the memory 215, the D/A converter 216, the display unit 108, and the EVF 217.

The camera 100 further includes a system memory 218, the nonvolatile memory 219, a system timer 220, a communication unit 221, an orientation detection unit 222, and the eyepiece detection unit 118.

The system memory 218 is, for example, RAM. In the system memory 218, constants and variables for the operations of the system control unit 50 and programs or the like read from the nonvolatile memory 219 are expanded. The nonvolatile memory 219 is electrically erasable and recordable memory. The nonvolatile memory 219 is, for example, an EEPROM. In the nonvolatile memory 219, constants and programs or the like for the operations of the system control unit 50 are recorded. In this case, the programs are programs for implementing the flowcharts, which will be described later. The system timer 220 is a timer unit for measuring a time used for various kinds of control and the time of a built-in clock. The communication unit 221 transmits and receives a video signal and an audio signal to and from external equipment connected wirelessly or via a wired cable. The communication unit 221 can be also connected to a wireless local area network (LAN) and the Internet. Moreover, the communication unit 221 can communicate with external equipment also via Bluetooth (registered trademark) and Bluetooth Low Energy. The communication unit 221 can transmit images (including a live image) captured by the imaging unit 211 and images recorded in the recording medium 227 and receive images and other various kinds of information from the external equipment. The orientation detection unit 222 detects the orientation of the camera 100 with respect to the direction of gravity. Based on the orientation detected by the orientation detection unit 222, it can be determined whether an image has been captured by the imaging unit 211 with the camera 100 in a horizontal position or in a vertical position. The system control unit 50 can add orientation information, which corresponds to the orientation detected by the orientation detection unit 222, to the image file of the image captured by the imaging unit 211 or rotate the image according to the detected orientation. The orientation detection unit 222 may be, for example, an acceleration sensor or a gyro sensor. A motion (e.g., pan, tilt, lift, stationary or not) of the camera 100 can be also detected by using the orientation detection unit 222.

The eyepiece detection unit 118 can detect an object approaching the eyepiece part 116 (eyepiece finder 117). The eyepiece detection unit 118 may be, for example, an infrared proximity sensor. When an object approaches the eyepiece part 116, infrared radiation from the light-emitting part of the eyepiece detection unit 118 is reflected by the object and is received by the light-receiving part of the infrared proximity sensor. A distance from the eyepiece part 116 to the object can be determined according to the amount of received infrared radiation. In this way, the eyepiece detection unit 118 performs approach detection for detecting a distance of approach from the object to the eyepiece part 116. The eyepiece detection unit 118 is an eyepiece detection sensor for detecting an eye (object) moving close to (approaching) and moving away from (separating from) the eyepiece part 116. If an object approaching the eyepiece part 116 in a predetermined distance is detected from a non-approaching state (a moving-away state), the approach of the object is detected. If the object moves away from the eyepiece part 116 for the predetermined distance or more from an approaching state (a moving-close state), the separation of the object is detected. Different threshold values may be used for detecting the approach of an object and detecting the separation of the object with, for example, a hysteresis. Moreover, it is assumed that after the approach of an object is detected, an approaching state continues until the separation of the object is detected. It is assumed that after the separation of the object is detected, a non-approaching state continues until an approach of the object is detected. The system control unit 50 switches show (displayed state)/hide (hidden state) of the display unit 108 and the EVF 217 according to a state detected by the eyepiece detection unit 118. Specifically, at least in a shooting standby state and automatic switching as a switching setting on the display, the display unit 108 is shown and the EVF 217 is hidden during a non-approaching state. During an approaching state, the EVF 217 is shown and the display unit 108 is hidden. The eyepiece detection unit 118 is not limited to an infrared proximity sensor. The eyepiece detection unit 118 may be other sensors capable of detecting an approach.

The camera 100 further includes the finder-outside display unit 107, a finder-outside display drive circuit 223, a power control unit 224, a power supply 225, a recording medium I/F 226, and an operation unit 228.

The finder-outside display unit 107 is driven by the finder-outside display drive circuit 223 and displays various set values of the camera 100, for example, a shutter speed and an aperture. The power control unit 224 includes a battery detection circuit, a DC-DC converter, and a switch circuit for switching blocks to be energized. The power control unit 224 detects, for example, the presence or absence of a battery, a battery type, and a remaining battery capacity. Moreover, the power control unit 224 controls the DC-DC converter based on the detection result and an instruction from the system control unit 50 and supplies a required voltage to parts including the recording medium 227 for a period. The power supply 225 includes primary batteries such as an alkaline battery and a lithium battery, secondary batteries such as a NiCd battery, an NiMH battery, and a Li battery, and an AC adapter. The recording medium I/F 226 is an interface to the recording medium 227, e.g., a memory card or a hard disk. The recording medium 227 is, for example, a memory card for recording captured images and includes a semiconductor memory and a magnetic disk. The recording medium 227 may be detachable from the camera 100 or may be built into the camera 100.

The operation unit 228 is an input unit for receiving an operation from the user (user operation). The operation unit 228 is used for inputting various instructions to the system control unit 50. The operation unit 228 includes the shutter button 101, the power switch 102, the mode-change switch 103, the touch panel 109, and other operation units 229. The other operation units 229 include the main electronic dial 104, the sub electronic dial 105, the moving-image button 106, the direction key 110, the SET button 111, and the AE lock button 112, the zoom-in button 113, the playback button 114, the menu button 115, and the touch bar 119.

The shutter button 101 includes a first shutter switch 230 and a second shutter switch 231. The first shutter switch 230 is turned on to output a first shutter-switch signal SW1 during an operation of the shutter button 101, that is, a half press (shooting preparation instruction) of the shutter button 101. The system control unit 50 starts shooting preparation including AF processing, AE processing, AWB processing, and EF processing in response to the first shutter-switch signal SW1. The second shutter switch 231 is turned on to output a second shutter-switch signal SW2 at the completion of an operation of the shutter button 101, that is, a full press (shooting instruction) of the shutter button 101. In response to the second shutter-switch signal SW2, the system control unit 50 starts a sequence of photo shooting from the reading of a signal from the imaging unit 211 to the writing of a generated image file, which includes captured images, into the recording medium 227.

The mode-change switch 103 switches the operation mode of the system control unit 50 to any one of a still-image shooting mode, a moving-image shooting mode, and a playback mode. The still-image shooting mode includes modes such as an auto shooting mode, an auto scene-determination mode, a manual mode, an aperture-priority mode (Av mode), a shutter-speed priority mode (Tv mode), and a program AE mode (P mode). Moreover, various scene modes serving as shooting settings for respective shooting scenes and custom modes are included. The user can directly switch to any one of the shooting modes by the mode-change switch 103. Alternatively, after switching to a list screen of the shooting modes by the mode-change switch 103, the user can selectively switch to any one of the displayed shooting modes by the operation unit 228. Likewise, the moving-image shooting mode may include multiple modes.

The touch panel 109 is a touch sensor for detecting various touching operations on the display screen of the display unit 108 (the operation screen of the touch panel 109). The touch panel 109 and the display unit 108 can be integrated into a single unit. For example, the touch panel 109 is attached to the upper layer of the display screen of the display unit 108 such that the light transmittance does not interfere with the display of the display unit 108. Furthermore, input coordinates on the touch panel 109 and display coordinates on the display screen of the display unit 108 are associated with each other, thereby configuring a graphical user interface (GUI) such that the user can directly operate a screen displayed on the display unit 108. The touch panel 109 may be any one of various types including a resistive type, a capacitive type, a surface acoustic wave type, an infrared type, an electromagnetic induction type, an image recognition type, and a photosensor type. A touch is detected when the touch panel 109 is touched or when a finger or a pen is brought close to the touch panel 109, depending upon the type of the touch panel 109. In any case, any type of touch panel may be used.

For the touch panel 109, the system control unit 50 can detect the following operations or states:

A first touch of a finger or a pen on the touch panel 109, that is, the start of a touch (hereinafter referred to as touch-down)

A touch on the touch panel 109 with a finger or a pen (hereinafter referred to as touch-on)

A finger or a pen moving in contact with the touch panel 109 (hereinafter referred to as touch-move)

A finger or a pen moving away (released) from the touch panel 109, that is, the end of a touch (hereinafter referred to as touch-up)

Nothing in contact with the touch panel 109 (hereinafter referred to as touch-off)

When touch-down is detected, touch-on is also detected at the same time. After touch-down, touch-on is continuously detected unless touch-up is detected. Also when touch-move is detected, touch-on is detected at the same time. Even if touch-on is detected, touch-move is undetected as long as the touch position is not moved. After the touch-up of all fingers or a pen from the touch panel 109 is detected, touch-off is determined.

These operations and states and the position coordinates of a finger or a pen on the touch panel 109 are notified to the system control unit 50 through an internal bus. The system control unit 50 determines an operation (touch) on the touch panel 109 based on the notified information. In touch-move, the moving direction of a finger or a pen on the touch panel 109 can be also determined for each vertical component and horizontal component on the touch panel 109 based on a change of the position coordinates. When touch-move for a predetermined distance or more is detected, it is determined that a sliding operation has been performed. A flick is to quickly move a finger for a certain distance on the touch panel 109 and release the finger from the touch panel 109. In other words, a flick is to quickly move a finger with a light sharp contact on the touch panel 109. When touch-move at a predetermined speed or higher for a predetermined distance or more is detected and then touch-up is detected, it is determined that a flick has been performed (it can be determined that a flick has been performed subsequently to a sliding operation). Furthermore, to pinch in is to bring touching positions at multiple points (multi-touch at, e.g., two points) close to each other, whereas to pinch out is to move the touching positions apart from each other. To pinch out and to pinch are collectively called a pinching operation (or simply referred to as a pinch).

Figure 4:
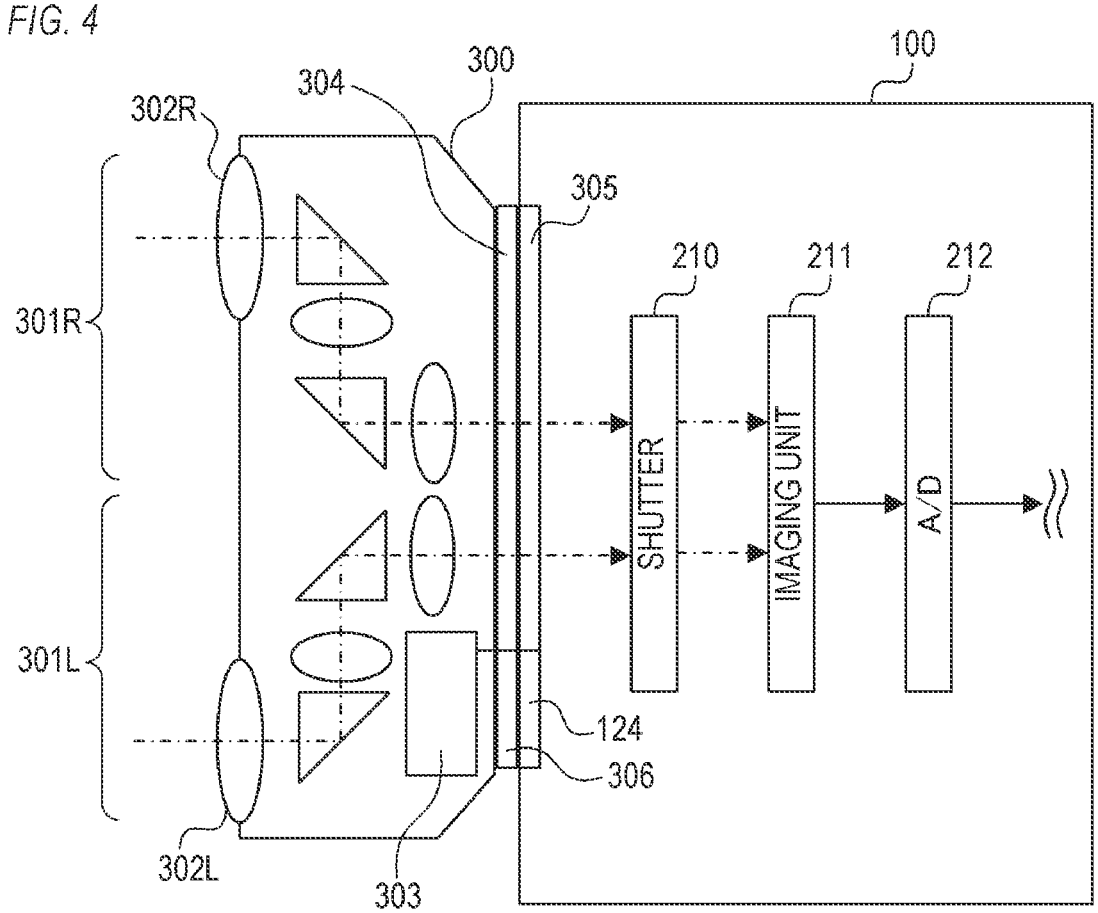
FIG. 4 is a schematic diagram illustrating the configuration of a lens unit.

FIG. 4 is a schematic diagram illustrating an example of the configuration of the lens unit 300. In FIG. 4, the lens unit 300 is attached to the camera 100. In the camera 100 illustrated in FIG. 4, the same constituent elements as those of FIG. 3 are indicated by the same reference numerals as in FIG. 3, and an explanation thereof is optionally omitted.

The lens unit 300 is a kind of interchangeable lens detachable from the camera 100. The lens unit 300 is a dual-lens unit that can capture a right image and a left image with a parallax. In the present embodiment, the lens unit 300 includes two optical systems. Each of the optical systems can capture the range of a wide view angle of about 180°. Specifically, each of the two optical systems of the lens unit 300 can capture an object over a field of view (an angle of view) of 180° in the horizontal direction (horizontal angle, azimuth angle, yaw angle) and 180° in the vertical direction (vertical angle, altitude angle, pitch angle). In other words, each of the optical systems can capture the range of a front hemisphere.

The lens unit 300 includes a right-eye optical system 301R having a plurality of lenses and reflection mirrors, a left-eye optical system 301L having a plurality of lenses and reflection mirrors, and a lens-system control circuit 303. The right-eye optical system 301R is an example of a first optical system. The left-eye optical system 301L is an example of a second optical system. The right-eye optical system 301R has a lens 302R disposed near the object. The left-eye optical system 301L has a lens 302L disposed near the object. The lens 302R and the lens 302L are oriented in the same direction with the optical axes substantially parallel to each other.

The lens unit 300 is a dual-lens unit (VR180 lens) for obtaining an image of VR180, a format of a virtual reality (VR) image that can be viewed in binocular vision. In the present embodiment, the lens unit 300 has a fish-eye lens in each of the right-eye optical system 301R and the left-eye optical system 301L, the fish-eye lens being capable of capturing the range of about 180°. The lens in each of the right-eye optical system 301R and the left-eye optical system 301L may capture a range of about 160° smaller than the range of 180°. The lens unit 300 can form a right image (first image) and a left image (second image) on one or two image pickup devices of the camera with the lens unit 300 attached to the camera. The right image is formed through the right-eye optical system 301R, and the left image is formed through the left-eye optical system 301L.

The lens unit 300 is attached to the camera 100 via a lens mount part 304 and a camera mount part 305 of the camera 100. With this configuration, the system control unit 50 of the camera 100 and the lens-system control circuit 303 of the lens unit 300 are electrically connected to each other via the communication terminal 124 of the camera 100 and a communication terminal 306 of the lens unit 300.

In the present embodiment, a right image formed through the right-eye optical system 301R and a left image formed through the left-eye optical system 301L are formed at the same time (as a set) in the imaging unit 211 of the camera 100. In other words, two optical images formed through the right-eye optical system 301R and the left-eye optical system 301L are formed on one image pickup device. The imaging unit 211 converts a formed object image (optical signal) into an analog electric signal. By using the lens unit 300, two images with a parallax can be obtained at the same time (as a set) from two points (optical systems) on the right-eye optical system 301R and the left-eye optical system 301L. VR display is provided for each of the left-eye image and the right-eye image of the obtained images, enabling the user to view a three-dimensional VR image over the range of about 180°. In other words, the user can obtain a stereoscopic view of an image of VR180.

In this case, a VR image is an image viewable in VR display, which will be described later. VR images include an omnidirectional image (whole-celestial spherical image) captured by an omnidirectional camera (whole-celestial sphere camera) and a panoramic image having a video range (effective video range) larger than a display range that can be displayed at a time on the display part. Moreover, VR images include a moving image and a live image (an image obtained substantially in real time from a camera) as well as a still image. A VR image has a maximum video range (effective video range) corresponding to a field of view over 360° in the horizontal direction and 360° in the vertical direction. VR images also include an image having an angle of view larger than an angle of view that can be captured by an ordinary camera or a video range larger than a display range that can be displayed at a time on the display part, even if the video range is smaller than 360° in the horizontal direction and 360° in the vertical direction. An image captured by the camera 100 with the lens unit 300 is a kind of VR image. A VR image can be viewed in VR display by setting, for example, the display mode of a display device (a display device capable of displaying a VR image) at "VR view." A VR image having a 360-degree angle of view is viewed in VR display; meanwhile, the user changes the orientation of the display device in the lateral direction (horizontal rotation direction), so that omnidirectional video can be seamlessly viewed in the horizontal direction.

VR display (VR view) is a display method (display mode) for displaying, from among VR images, video in a field of view corresponding to the orientation of the display device, the display method being capable of changing a display range. VR display includes "single-lens VR display (single-lens VR view)" in which an image is displayed after deformation (distortion correction) for mapping a VR image on a virtual sphere. VR display includes "dual-lens VR display (dual-lens VR view)" in which a left-eye VR image and a right-eye VR image are displayed in left and right areas after deformation (distortion correction) for mapping the VR images on a virtual sphere. "Dual-lens VR display" is provided using a left-eye VR image and a right-eye VR image with a parallax, achieving a stereoscopic view of the VR images. In any type of VR display, for example, if the user wears a display device, e.g., an HMD (head-mounted display), video is displayed in a field of view corresponding to the orientation of a user's face. For example, it is assumed that from among VR images, video is displayed in a field of view having its center at 0° (a specific cardinal point, e.g., the north) in the horizontal direction and 90° (90° from the zenith, that is, the horizon) in the vertical direction at a certain point in time. In this state, the orientation of the display device is flipped (for example, the display screen is changed from a southern aspect to a northern aspect), so that from among the same VR images, the display range is changed to video in a field of view having its center at 180° (an opposite cardinal point, e.g., the south) in the horizontal direction and 90° in the vertical direction. In other words, when the face of the user with the HMD is turned from the north to the south (that is, the user turns around), video displayed on the HMD is changed from the north to the south. A VR image captured by the lens unit 300 of the present embodiment is an image captured in a forward range of about 180° (180-degree image). Video in a backward range of about 180° is not present. In the VR display of such an image, when the orientation of the display device is changed to a side where video is absent, a blank area is displayed.

Such VR display of a VR image makes the user feel like staying in the VR image (VR space) in a visual form (sense of immersion). The display method of a VR image is not limited to a method for changing the orientation of the display device. For example, the display range may be moved (scrolled) in response to a user operation via a touch panel or a directional button or the like. Moreover, in VR display (display mode "VR view"), the display range may be changed in response to touch-move on a touch panel, a drag operation with a mouse or the like, or a press to a directional button in addition to a change of the display range by a change of the orientation. A smartphone attached to a VR goggle (head-mounted adapter) is a kind of HMD.

Figure 5:
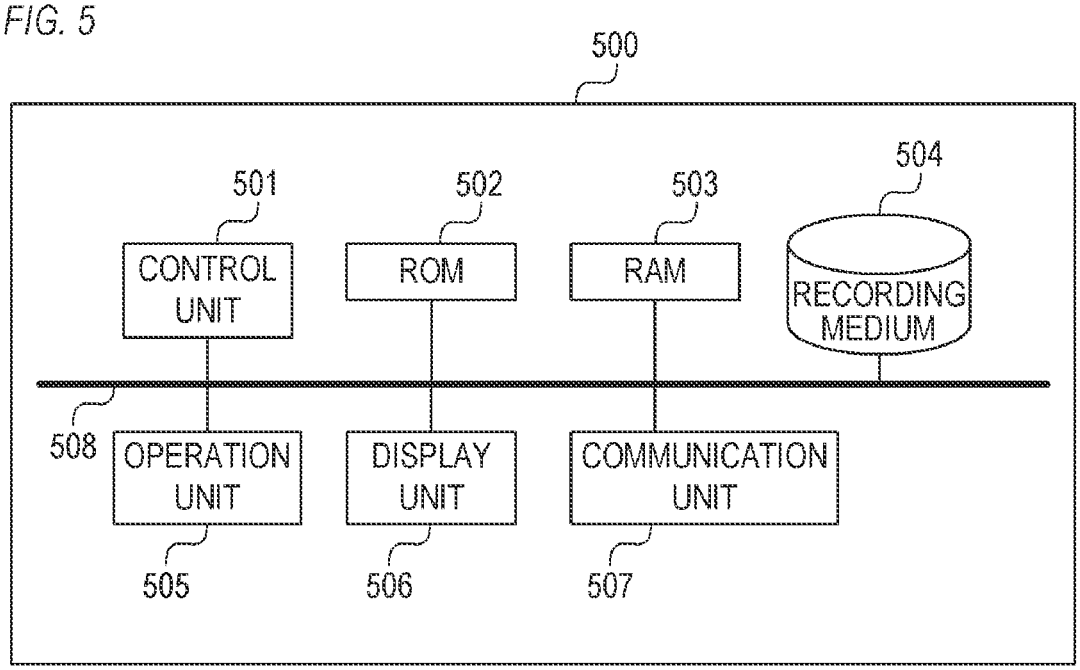
FIG. 5 is a block diagram illustrating the configuration of a PC.

FIG. 5 is a block diagram illustrating an example of the configuration of the PC 500. A control unit 501 is, for example, a central processing unit (CPU) that controls the overall PC 500. A read only memory (ROM) 502 stores programs and parameters in a non-transitory manner. A random access memory (RAM) 503 temporarily stores programs and data that are supplied from external equipment or the like. A recording medium 504 is, for example, a hard disk or a flash memory that is stationarily installed in the PC 500 or an optical disk, a magnetic card, an optical card, an IC card, or a memory card that is detachable from the PC 500. A file of images captured by the camera 100 is read from the recording medium 504. An operation unit 505 receives a user operation on the PC 500. An operation member used for a user operation may be a button or a touch panel that is provided on the PC 500 or a keyboard or a mouse that is detachable from the PC 500. A display unit 506 displays, for example, data held in the PC 500 or data supplied from the outside. The display unit 506 may be a part of the PC 500 or a separate display device of the PC 500. A communication unit 507 communicates with external equipment such as the camera 100. A system bus 508 connects the constituent elements of the PC 500 to enable communications among the constituent elements.

The characteristics of an image captured with attached the lens unit 300 (dual lenses) will be described below. In the case of the lens unit 200 (ordinary single lens), an image (an image rotated 180°) vertically and horizontally inverted from its actual view is formed on the imaging unit 211. Thus, the formed image is entirely rotated 180° to obtain (form) an image matching its actual view. In the case of the lens unit 300 (dual lenses), a right image and a left image are rotated 180° from their actual views and are formed on the imaging unit 211. The layout of the right image and the left image is not particularly limited. In the present embodiment, it is assumed that the right image is formed on the right side while the left image is formed on the left side on the imaging unit 211. As in the case of the lens unit 200 (ordinary single lens), when the formed image (including an image area of the right image and an image area of the left image) is entirely rotated 180°, the right image and the left image can be matched with their actual views, but the positions of the right image and the left image are exchanged with each other. In other words, the positional relationship between the left and right images is inverted, so that an image is captured with the right image disposed on the left side and the left image disposed on the right side. In the present embodiment, the right image and the left image can be displayed at positions corresponding to the two optical systems (the right-eye optical system 301R and the left-eye optical system 301L).

Figure 6:
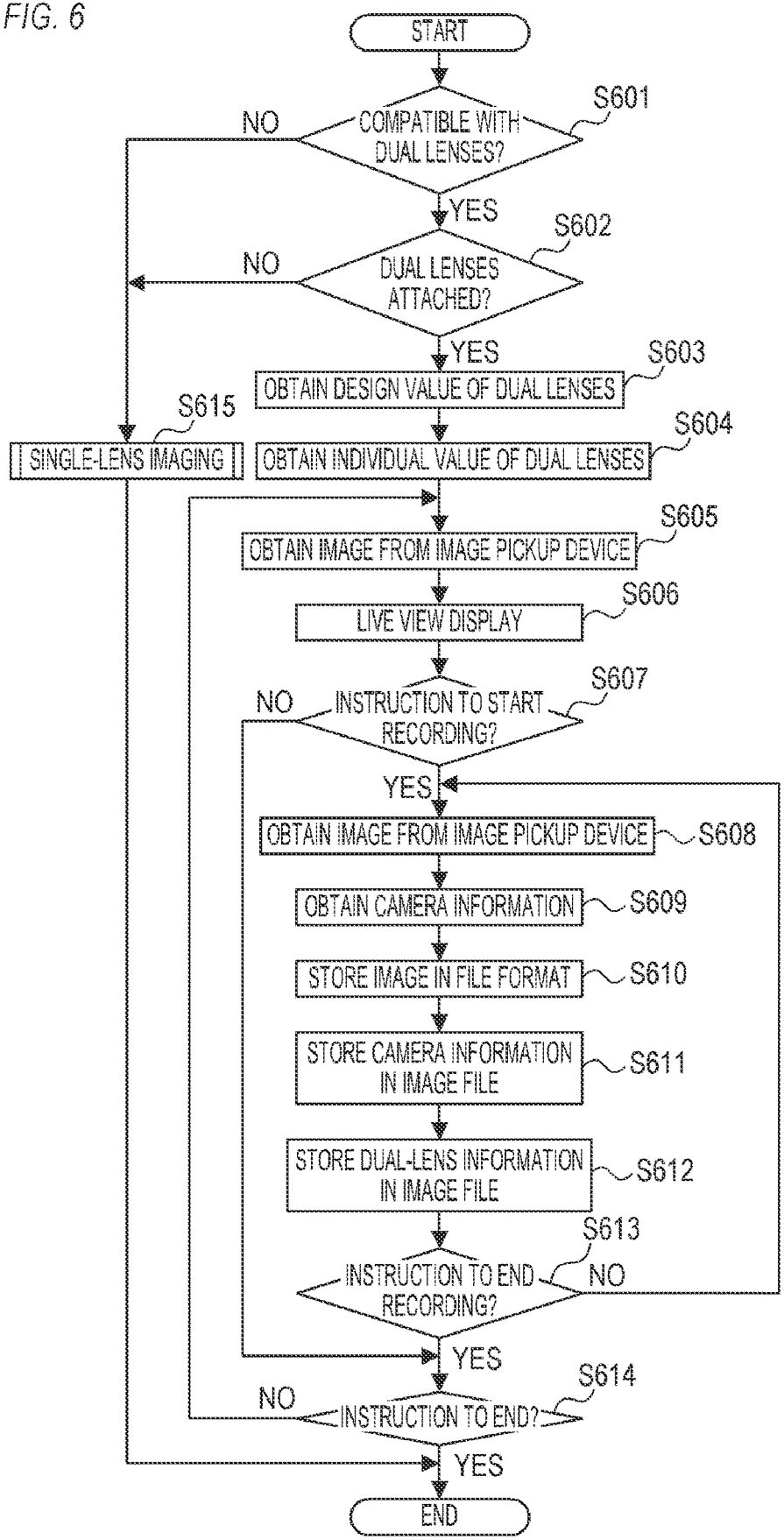
FIG. 6 is a flowchart indicating the operations of the camera.

FIG. 6 is a flowchart indicating an example of the operations (shooting-mode processing) of the camera 100 in the shooting mode. These operations are implemented by expanding and running programs, which are recorded in the nonvolatile memory 219, in the system memory 218 by the system control unit 50. For example, when the camera 100 is started in the shooting mode or the mode of the camera 100 is changed to the shooting mode, the operations of FIG. 6 are started.

In step S601, the system control unit 50 determines whether the camera 100 is provided for dual lenses (e.g., the lens unit 300). For example, the system control unit 50 determines whether the firmware version of the system control unit 50 is compatible with dual lenses. If it is determined that the version is compatible with dual lenses, the process advances to step S602. Otherwise the process advances to step S615. In the present embodiment, dual lenses require the acquisition and recording of dual-lens information (lens information; information on the two optical systems of the dual lenses) to perform postprocessing unlike an ordinary single lens. Thus, the processing of step S601 is performed.

In step S602, the system control unit 50 determines whether dual lenses have been attached to the camera 100. If it is determined that dual lenses have been attached, the process advances to step S603. Otherwise the process advances to step S615. If dual lenses are attached in a state in which dual lenses are absent, the process advances to step S603. If attached dual lenses are removed and then a single lens is attached, the process advances to step S615.

In step S603, the system control unit 50 obtains the design value of attached (connected) dual lenses from the dual lenses. The design value is a parameter in design and is used for exchanging the positions of left and right images, which will be described later, and the equidistant cylinder transformation. For example, an image circle position, an image circle diameter, an angle of view, and a distortion correction coefficient in FIG. 10B are obtained. An object image captured by the lens is reflected in a circular shape on the surface of the image pickup device. An image circle means the circular object image (circular image).

In step S604, the system control unit 50 obtains the individual value of the attached (connected) dual lenses from the dual lenses. The individual value is a parameter specific for (intrinsic to) a lens unit, for example, an error during manufacturing. For example, an image-circle displacement, an optical-axis inclination, and an image magnification deviation in FIG. 10B are obtained. Using the individual value enables image processing with higher accuracy than the use of a design value.

In step S605, the system control unit 50 obtains an image from the imaging unit 211.

In step S606, the system control unit 50 displays the image, which is obtained in step S605, on the EVF 217 or the display unit 108 (live view display).

In step S607, the system control unit 50 determines whether an instruction to start recording has been provided by the user of the camera 100. If it is determined that an instruction to start recording has been provided, the process advances to step S608. Otherwise the process advances to step S614. Live view display on the EVF 217 or the display unit 108 continues until the instruction to start recording or an instruction to end in step S614, which will be described later, is provided.

The instruction to start recording is a full press on the shutter button 101. The instruction to start recording may be an instruction to perform shooting of a still image or an instruction to start shooting of a moving image. An image to be captured may be any one of a JPEG still image, an MP4 video, a RAW still image, and a RAW video. During the shooting of a moving image, the moving image being recorded may be displayed on the EVF 217 or the display unit 108 as in live view display.

In step S608, the system control unit 50 obtains an image from the imaging unit 211.

In step S609, the system control unit 50 obtains shooting information about a shutter speed and an aperture during shooting and orientation information detected by the orientation detection unit 222. In the shooting of a RAW image, data (parameter) for development is also obtained.

In step S610, the system control unit 50 stores data on the image (image data) obtained in step S608, in a file format in the recording medium 227 (storage medium).

In step S611, the system control unit 50 stores the information (information about the camera 100) obtained in step S609, in the image file stored in step S610. Thus, in the image file, the information obtained in step S609 is added as metadata to the image data obtained in step S608.

In step S612, the system control unit 50 stores the information (information about dual lenses) obtained in steps S603 and S604, in the image file stored in step S610. Thus, in the image file, the information obtained in steps S603 and S604 is added as metadata to the image data obtained in step S608.

In step S613, the system control unit 50 determines whether an instruction to end recording has been provided by the user of the camera 100. If it is determined that an instruction to end recording has been provided, the process advances to step S614. Otherwise the process advances to step S608. Steps S608 to S613 are repeated, enabling consecutive recording of the frames of moving images in a video file or continuous shooting (consecutive shots) of still images.

In the shooting of a still image, the instruction to end recording is, for example, a reset of a full press on the shutter button 101. When the fully pressed shutter button 101 is released in a predetermined time, a still image is captured. If a full press on the shutter button 101 continues for the predetermined time or longer, still images are consecutively captured. In the shooting of a still image, a full press on the shutter button 101 may serve as the instruction to start recording and the instruction to end recording. In the shooting of a moving image, the instruction to end recording is, for example, a full press on the shutter button 101. For example, when the shutter button 101 is fully pressed after the shooting of a moving image is started by a full press on the shutter button 101, the shooting of the moving image is ended.

In step S614, the system control unit 50 determines whether an instruction to end has been provided by the user of the camera 100. If it is determined that the instruction to end has been provided, the operations of FIG. 6 are ended. Otherwise the process advances to step S605. The instruction to end is, for example, an instruction to power off the camera 100 or an instruction to switch the mode of the camera 100 from the shooting mode to another mode. Specifically, the instruction to end is, for example, a press to the power switch 102 or a press to the mode-change switch 103.

If a single lens is attached to the camera 100, the processing of step S615 is performed. In step S615, the system control unit 50 captures an image (shooting) by using a single lens (single-lens imaging). The single-lens imaging operations are similar to conventional imaging (shooting) operations in a camera with a single lens, and thus a detailed explanation thereof is omitted. In the present embodiment, when an image file of images captured by a single lens is recorded in the recording medium 227, the system control unit 50 obtains, from the single lens, information (e.g., a design value and an individual value) about the attached single lens and stores the information in the image file.

FIG. 7 is a flowchart indicating an example of operations (display control) for displaying an image by the PC 500 based on the image file. These operations are implemented by expanding and running programs (application programs), which are recorded in the ROM 502, in the RAM 503 by the control unit 501. For example, when a user of the PC 500 operates the operation unit 505 (operation member) to select an image file, which has been captured by the camera, from a file stored in the recording medium 504, the operations of FIG. 7 are started. At this point, the recording medium 227 removed from the camera 100 may be used as the recording medium 504. In the present embodiment, a right image and a left image are both circular fish-eye images (equidistant projection images). Operations for correcting the positions of the right image and the left image as circular fish-images by using information about the dual lenses as correction information will be described below.

Figure 9:
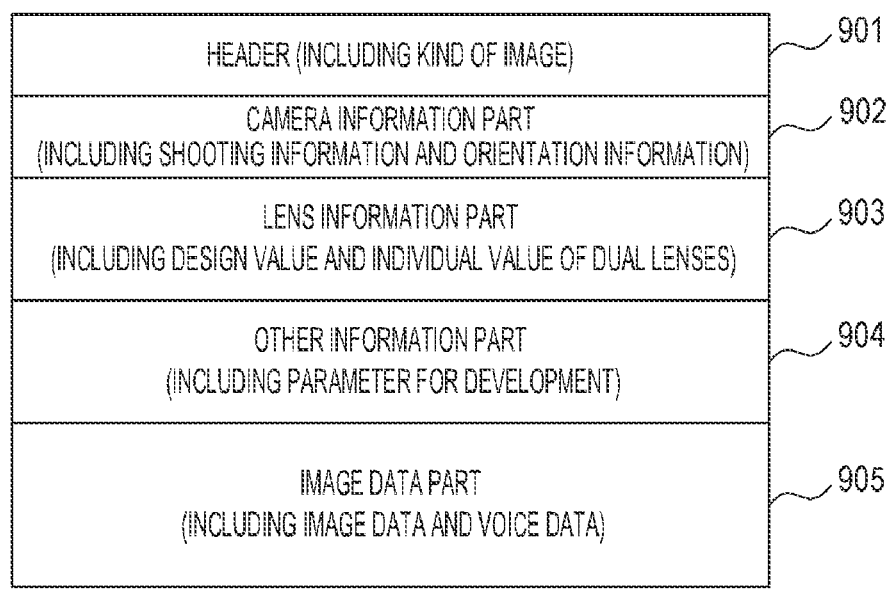
FIG. 9 is a schematic diagram illustrating the structure of an image file.

In step S701, the control unit 501 reads the image file, which is selected by the user of the PC 500, from the recording medium 504. In this case, a header and metadata that are added to the image data are also read in addition to captured image data. For example, an image file in FIG. 9 is read.

In step S702, the control unit 501 determines whether the image file has been captured by dual lenses (by using dual lenses), based on the image file read in step S701. If it is determined that the image file has been captured by dual lenses, the process advances to step S703. Otherwise the process advances to step S719. In step S702, for example, whether the image file has been captured by dual lenses may be determined depending upon whether the image file includes information (e.g., a design value and an individual value) on dual lenses. Whether the image file has been captured by dual lenses may be determined depending upon whether the image file includes a flag, which indicates the use of dual lenses, instead of detailed information on dual lenses.

In step S703, the control unit 501 obtains (extracts) information (a design value and an individual value) about dual lenses from the image file read in step S701.

Figure 8A:
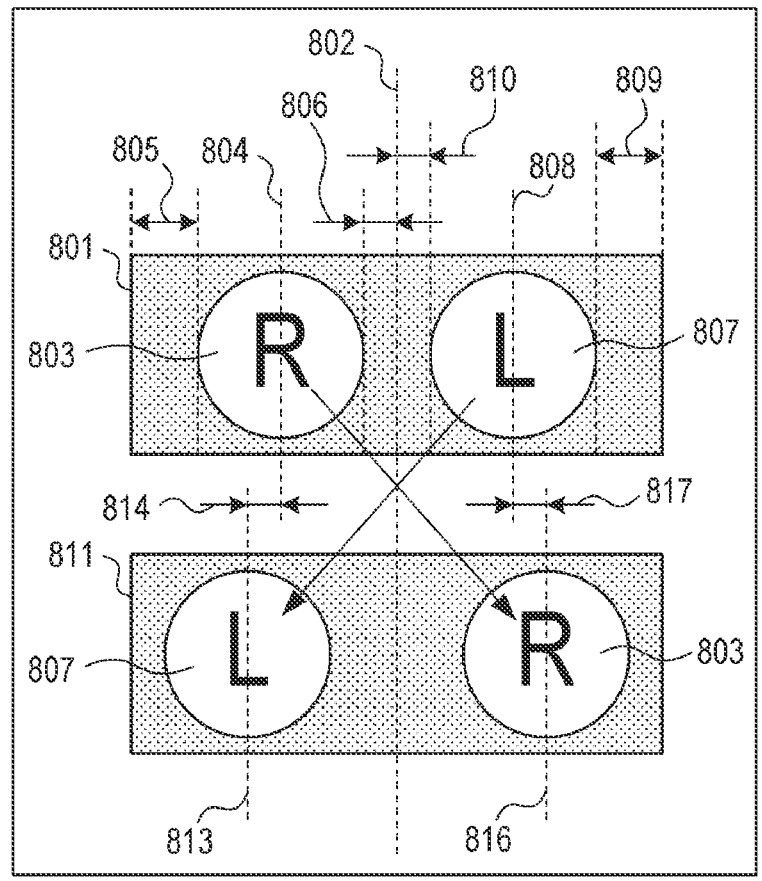
FIGS. 8A and 8B are schematic diagrams illustrating the exchange of the positions of left and right images.
Figure 8B:
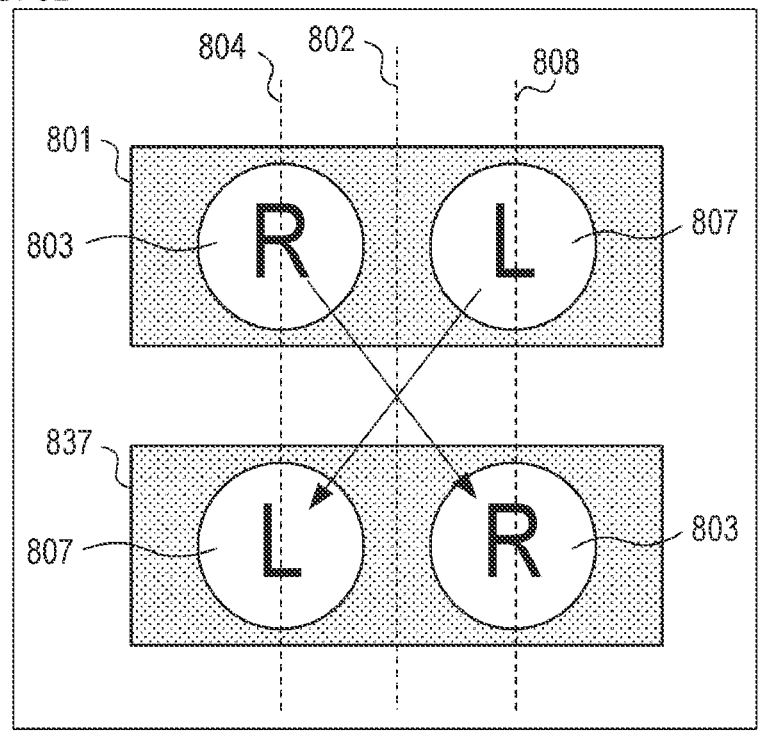

In step S704, the control unit 501 obtains the center coordinates of a right image and a left image in the captured image, from the design value obtained in step S703. The center coordinates of the right image and the left image correspond to the optical-axis center coordinates of the two optical systems (the left-eye optical system 301L and the right-eye optical system 301R) with dual lenses. For example, center coordinates 804 and 808 are obtained as illustrated in FIGS. 8A and 8B. The center coordinate 804 is the center coordinate of the right image in the lateral direction while the center coordinate 808 is the center coordinate of the left image in the lateral direction.

In step S705, the control unit 501 obtains the captured image from the image file read in step S701. If the obtained image is displayed as it is, the positions of the right and left images are exchanged in the displayed image. Thus, the positions of the right and left images are exchanged thereafter.

Figure 11A:
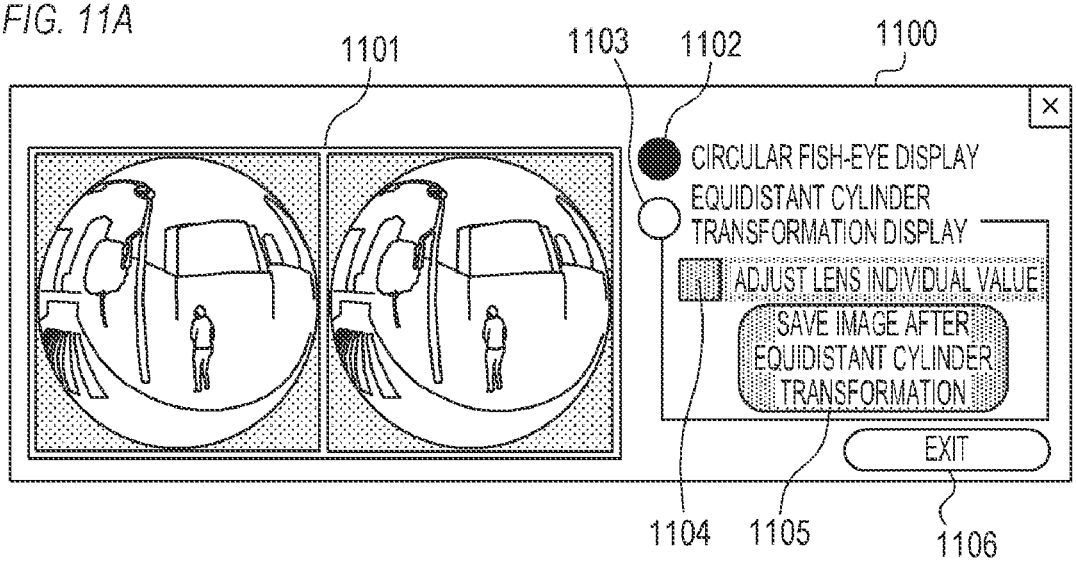
FIGS. 11A and 11B are schematic diagrams of a display screen.
Figure 11B:
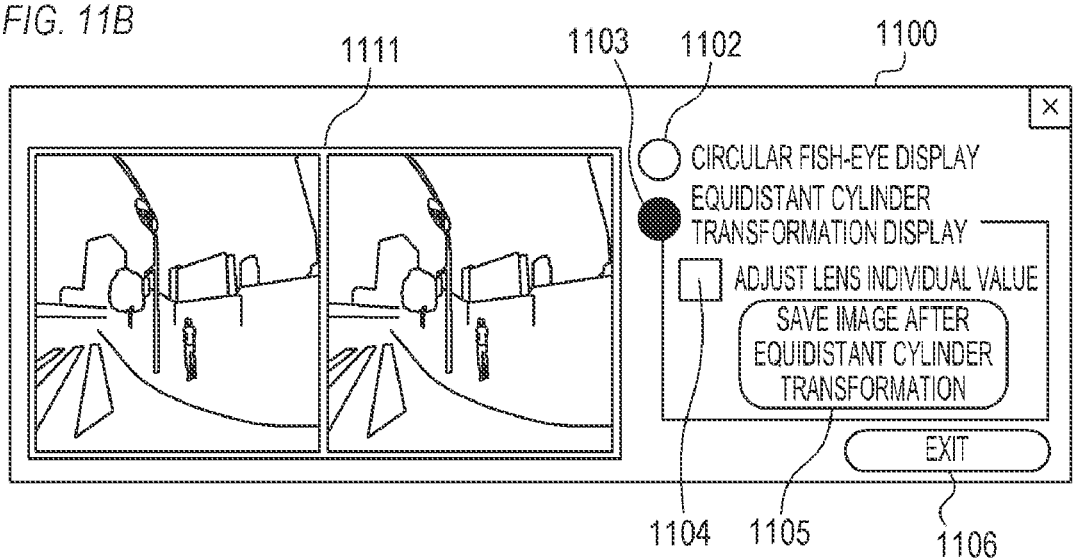

In step S706, the control unit 501 determines whether to provide circular fish-eye display. If it is determined that circular fish-eye display is to be provided, the process advances to step S707. Otherwise (if equidistant cylindrical display is provided) the process advances to step S710. In step S706, for example, whether to provide circular fish-eye display is determined depending upon whether a radio button 1102 in FIGS. 11A and 11B is selected or not. In FIG. 11A, the radio button 1102 is selected, whereas in FIG. 11B, the radio button 1102 is not selected. If the radio button 1102 is selected, it is determined that circular fish-eye display is to be provided, and then the process advances to step S707. If the radio button 1102 is not selected, the process advances to step S710. It is determined that circular fish-eye display is to be provided by default (for example, before screens in FIGS. 11A and 11B are displayed), and the process advanced to step S707 such that the process starts from circular fish-eye display. Operations after step S710 will be described later.

In step S707, based on center coordinates (the centers of the optical axes of the left-eye optical system 301L and the right-eye optical system 301R) obtained in step S704, the control unit 501 exchanges the positions of the right image and the left image in the captured image and generates a processed image (the positions of the left and right images have been exchanged). For example, the control unit 501 specifies the area of the right image in the captured image based on the center coordinate of the right image and specifies the area of the left image in the captured image based on the center coordinate of the left image. The control unit 501 then exchanges the positions of the two specified areas. In the present embodiment, a right image and a left image are horizontally placed next to each other in a captured image. By exchanging the positions of the left and right images, the positional relationship between the right image and the left image is horizontally inverted. The diameters (diameter or radius) of the right image and the left image may be acquired from dual-lens information in order to specify the areas of the right image and the left image with higher accuracy.

A method for exchanging the positions of the left and right images is not limited to the foregoing method. For example, displacements 805, 806, 809, and 810 in FIG. 8A may be obtained from the dual-lens information, a right image and a left image may be disposed while keeping the obtained displacements during the exchange of the positions of the right and left images, and other areas may be filled in with black. The displacement 805 is a distance from the left end of a captured image to the left end of the right image, and the displacement 806 is a distance from the center of the captured image to the right end of the right image. When the positions of the left and right images are exchanged, the displacement 805 is a distance from the left end of the captured image to the left end of the left image, and the displacement 806 is a distance from the center of the captured image to the right end of the left image. Likewise, the displacement 809 is a distance from the right end of the captured image to the right end of the left image, and the displacement 810 is a distance from the center of the captured image to the left end of the left image. When the positions of the left and right images are exchanged, the displacement 809 is a distance from the right end of the captured image to the right end of the right image, and the displacement 810 is a distance from the center of the captured image to the left end of the right image.

In step S708, the control unit 501 displays the processed image, which is generated in step S707, on the display unit 506. For example, a processed image 1101 in FIG. 11A is displayed on the display unit 506.

In step S709, the control unit 501 determines whether an instruction to end has been provided by the user of the PC 500. If it is determined that the instruction to end has been provided, the operations of FIG. 7 are ended. Otherwise the process advances to step S706. This can switch display on the display unit 506 (the display of a captured image) among multiple displays including circular fish-eye display and equidistant cylindrical display. The instruction to end is provided by using the operation unit 505 (operation member). The instruction to end is, for example, a press to an exit button 1106 in FIGS. 11A and 11B.

If an image file captured by a single lens is read in step S701, the processing of step S719 is performed. In step S719, the control unit 501 displays, on the display unit 506, an image based on the image file captured by the single lens. The processing of step S719 is identical to conventional processing in which an image captured by a single lens is displayed, and thus a detailed explanation thereof is omitted.

FIGS. 8A and 8B are schematic diagrams illustrating the exchange of the positions of left and right images; FIG. 8A illustrates a conventional exchange of the positions of the left and right images without using information on dual lenses. FIG. 8B illustrates an exchange of the positions of the left and right images by using information on dual lenses as the correction information according to the present embodiment.

As illustrated in FIGS. 8A and 8B, an image 801 before the exchange includes a right image 803 disposed as a circular fish-eye image on the left side and a left image 807 disposed as a circular fish-eye image on the right side.

In FIG. 8A, the image 801 is divided into a left-half image and a right-half image at a center coordinate 802 of the image 801, and then the left-half image and the right-half image are exchanged with each other. In other words, the left-half image is moved to the right of the right-half image. An image 811 is an image formed after the exchange of the left and right images.

In FIG. 8A, the displacement 806 is smaller than the displacement 805. In other words, in the image 801, the right image 803 is deviated from the center of the left half of the image 801 toward the center of the image 801. Likewise, the displacement 810 is smaller than the displacement 809. In other words, in the image 801, the right image 807 is deviated from the center of the right half of the image 801 toward the center of the image 801. Hence, in the image 811, a center coordinate 813 of the left image 807 in the lateral direction is displaced from the center coordinate 804 by a distance 814, and a center coordinate 816 of the right image 803 in the lateral direction is displaced from the center coordinate 808 by a distance 817.

By using the lens information in the present embodiment, the center coordinate of the left image in the lateral direction can be aligned with the center coordinate 804, and the center coordinate of the right image in the lateral direction can be aligned with the center coordinate 808 in an image 837 where the positions of the left and right images have been exchanged (FIG. 8B).

FIG. 9 is a schematic diagram illustrating an example of the structure of an image file captured by dual lenses. The image file of FIG. 9 includes a header 901, a camera information part 902, a lens information part 903, another information part 904, and an image data part 905. In the header 901, information including the kinds of captured images is recorded. In the camera information part 902, information on the camera used for shooting is recorded as metadata. For example, shooting information about a shutter speed and an aperture during shooting and orientation information on the camera during shooting are recorded. In the lens information part 903, information on dual lenses used for shooting is recorded as metadata. For example, a design value and an individual value of dual lenses are recorded. In the other information part 904, other information is recorded as metadata. For example, in the case of a moving image, information that changes for each frame is recorded. In the case of a RAW image, data for development is recorded. In the image data part 905, image data is recorded. In the case of a moving image, voice data is recorded as well as image data. In this example, the information on the camera, the information on dual lenses, and other information are recorded in the same image file. The information may be recorded in another file associated with the image file.

FIG. 10A is a schematic diagram indicating an example of lens information that is acquired from dual lenses. The lens information includes:
 1. lens design value
 2. lens individual value
 3. lens flag
 4. lens focal length
 5. lens temperature The lens design value is a design value for correcting an aberration. In the manufacturing process of dual lenses, each of the two optical systems (the left-eye optical system 301L and the right-eye optical system 301R) has an error, for example, decentering or inclination of the lens. If the positions of the left and right images are exchanged or the equidistant cylinder transformation is performed without consideration of an error, the quality of dual-lens VR display is reduced, leading to difficulty in obtaining a satisfactory stereoscopic view. The lens individual value is, for example, the measurement result of an error detected in the manufacturing process of dual lenses. The lens design value and the lens individual value will be specifically described later in accordance with FIG. 10B.

Figure 16A:
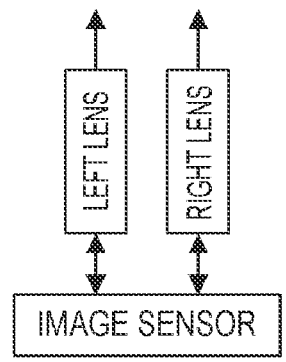
FIGS. 16A and 16B are diagrams indicating a difference between left and right lenses.
Figure 16B:
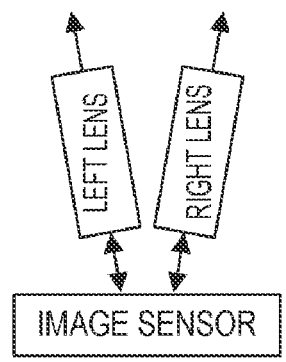

If the positions of the left and right images are exchanged or equidistant cylinder transformation is performed without consideration of the individual value (manufacturing error) of the lens, the quality of dual-lens VR display is reduced, leading to difficulty in obtaining a satisfactory stereoscopic view. Referring to FIGS. 16A and 16B, the cause of this problem will be described below. FIG. 16A illustrates an ideal optical system. In FIG. 16A, the optical axes of the left lens and the right lens are extended in parallel and are directed in the same direction. Thus, a parallax increases as an object approaches the image sensor, achieving a proper stereoscopic view. FIG. 16B illustrates an example of an optical system having an error from a design value. In FIG. 16B, the optical axes of the left lens and the right lens are not extended in parallel and are directed in different directions. This causes a parallax at infinity, interfering with a proper stereoscopic view. In addition, the individual values of the left and right lenses may cause a parallax in the vertical direction or cause varying image magnifications. This may interfere with a proper stereoscopic view. Thus, in the present embodiment, a captured image is corrected by using an error of the left and right images actually used for shooting, so that the image is corrected close to an image captured by an ideal optical system. This achieves a proper stereoscopic view.

The lens flag is a flag indicating dual lenses and can be used for determining whether dual lenses have been used. The lens focal length is a distance from "principal point," which is the center of the lens, to an image pickup device (image-forming position). The lens focal length may be or does not need to be a common parameter of the two optical systems (the left-eye optical system 301L and the right-eye optical system 301R) of dual lenses. In order to provide high-quality dual-lens VR display by accurately exchanging the positions of the left and right images or performing the equidistant cylinder transformation, a detailed (high-accuracy) lens focal length is used. The lens temperature is a temperature of dual lenses and is used for identifying an environmental temperature or the like at the time of imaging.

FIG. 10B is a schematic diagram indicating the detail of the lens design value and the lens individual value. In the present embodiment, the lens design value and the lens individual value are used as the correction information for exchanging the positions of left and right images and the equidistant cylinder transformation.

The lens design value includes:
 1. image circle position
 2. image circle diameter
 3. angle of view
 4. distortion correction coefficient The image circle position is the center coordinate of the optical axis of the optical system in an image to be captured. The image circle position is prepared for each of the two optical systems (the left-eye optical system 301L and the right-eye optical system 301R) of dual lenses. In other words, the image circle position is the center coordinate of an image circle (circular fish-eye image) formed on the image pickup device. The image circle position is prepared for each of the right image and the left image. The origin point of coordinates is, for example, the center of the image pickup device (the center of an image to be captured). The image circle position includes a coordinate in the horizontal direction and a coordinate in the vertical direction. The image circle position may be used from a variety of information on the center of the optical axis of the optical system in an image to be captured. For example, the image circle position may be a distance from a predetermined position (the center or an upper-left corner) in an image to the center of the optical axis.

The image circle diameter is the diameter of an image circle (circular fish-eye image) formed on the image pickup device. The angle of view is an angle of view of an image circle (circular fish-eye image) formed on the image pickup device. The distortion correction coefficient is the ratio of a design image height to the ideal image height of the lens. A distortion correction coefficient may be set for each image height, and a distortion correction coefficient may be calculated by interpolation in which a plurality of distortion correction coefficients are used. An approximate polynomial may be set for the relationship between an image height and a distortion correction coefficient. An image circle diameter, an angle of view, and a distortion correction coefficient may be or do not need to be common parameters of the two optical systems (the left-eye optical system 301L and the right-eye optical system 301R) of dual lenses.

When a circular fish-eye image is displayed, the PC 500 may display a magic window in the circular fish-eye image. The magic window is a display item for indicating an area to be (first) cut for VR display. For example, the magic window is displayed based on an image circle position, an image circle diameter, and an angle of view. This can improve the display quality of the magic window. In order to properly display the magic window, the PC 500 optionally edits and uses an image circle position, an image circle diameter, and an angle of view. For example, the PC 500 multiplies an image circle position or an image circle diameter by a coefficient.

The lens individual value includes:
  5. image circle displacement
  6. optical axis inclination
  7. image magnification deviation These kinds of information are prepared by measurements of the two optical systems (the left-eye optical system 301L and the right-eye optical system 301R) of dual lenses.

Figure 17A:
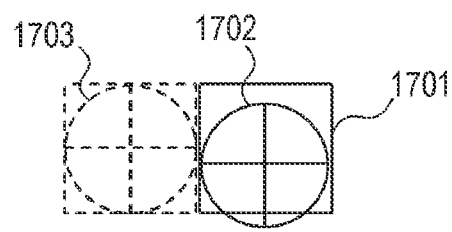
FIGS. 17A to 17D are diagrams indicating a displacement caused by an error of the lens.

The image circle displacement is a deviation of the center coordinate of an image circle (circular fish-eye image), which is formed on the image pickup device, from the design value. For example, the image circle displacement includes a deviation in the horizontal direction and a deviation in the vertical direction. A deviation in the horizontal direction is indicated by coordinates in the horizontal direction, and a deviation in the vertical direction is indicated by coordinates in the vertical direction with the origin point located at the coordinates of a design value (two-dimensional coordinates including coordinates in the horizontal direction and coordinates in the vertical direction). FIG. 17A indicates an example of a displacement of an image circle. An area 1701 indicates a right-half or left-half area of a sensor-size screen (imaging area). An image circle 1702 is an actual image circle of a right or left lens. An image circle 1703 is an ideal image circle of an optical system (design value). A displacement occurs between the position of the actual image circle 1702 and the ideal image circle 1703.

Figure 17B:
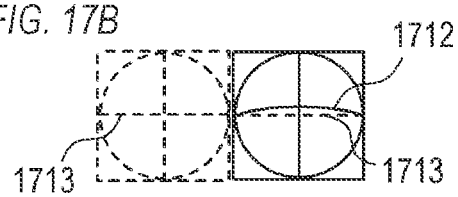
Figure 17C:

The optical axis inclination is a deviation from the design value in the direction of the optical axis near an object. For example, the optical axis inclination includes a deviation in the horizontal direction and a deviation in the vertical direction. A deviation in each direction is indicated by an angle. FIG. 17B indicates an example of a deviation caused by an optical inclination in the horizontal direction. A line 1712 indicates an actual direction (inclination) of the optical axis of the right or left lens in the horizontal direction. A line 1713 indicates an ideal direction of the optical axis of the optical system (design value) in the horizontal direction. A deviation occurs between the actual direction 1712 of the optical axis in the horizontal direction and the ideal direction 1713 of the optical axis in the horizontal direction. FIG. 17C indicates an example of a deviation caused by an optical inclination in the vertical direction. A line 1722 indicates an actual direction of the optical axis of the right or left lens in the perpendicular direction. A line 1723 indicates an ideal direction of the optical axis of the optical system (design value) in the horizontal direction. A deviation occurs between the actual direction 1722 of the optical axis in the horizontal direction and the ideal direction 1723 of the optical axis in the horizontal direction.

Figure 17D:
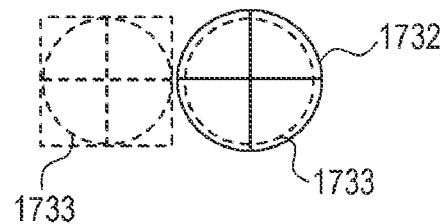

The image magnification deviation is a deviation of the size of an image circle (circular fish-eye image), which is formed on the image pickup device, from the design value. The deviation is indicated by, for example, a ratio to the design value. FIG. 17D indicates an example of an image magnification deviation. An image circle 1732 is an actual image circle formed on the image pickup device through a right or left lens. An image circle 1733 is an ideal image circle formed on the image pickup device through an optical system (design value). A deviation occurs between the actual image circle 1732 and the ideal image circle 1733 of the optical system.

Information included in the lens information is not limited to the foregoing information. For example, the lens information may include the boundary positions (the edge position of a circular fish-eye image; positions indicated by the displacements 805, 806, 809, and 810 or the like) of the right image and the left image in the captured image. The lens information may include midpoint coordinates between the right image and the left image in the captured image. In many cases, the midpoint coordinates match the center coordinates of the captured image. The lens information may include information which indicates an area of the magic window (for example, coordinates at the upper left corner of the magic window, a width of the magic window, and a height of the magic window). The lens information may include correction value (e.g., a correction value obtained by the calibration of dual lenses) for increasing the accuracy of the exchange of the positions of the left and right images and the equidistant cylinder transformation.

FIG. 10C is a schematic diagram illustrating an example of the camera information generated in the camera. For example, the camera information is used for providing high-quality VR display. The camera information includes:
  1. camera recording area information
  2. intra-camera accelerometer information
  3. right exposure correction information The camera recording area information is information on effective image areas. Displayable effective image areas vary depending on the sensor of the camera or the recording mode. The PC 500 uses the camera recording area information in order to provide more accurate display. The intra-camera accelerometer information is orientation information obtained by using an acceleration sensor (level) in the camera. The information indicates the orientation of the camera in the rolling direction or the pitch direction. The PC 500 uses the intra-camera accelerometer information in order to identify the orientation of the camera during shooting. The PC 500 performs, for example, electronic vibration isolation or horizontal correction (zenith correction that brings the vertical direction of display close to the vertical direction of an actual space). The right exposure correction information is an exposure set value for bringing the exposure of the right image close to the exposure of the left image. The PC 500 uses the right exposure correction information in order to provide natural (less awkward) dual-lens VR display.

FIG. 11A is a schematic diagram illustrating an example of display (display in step S708) on an application screen displayed on the display unit 506 by the control unit 501 after the positions of left and right images are exchanged. A screen 1100 is the application screen. The screen 1100 in FIG. 11A includes a processed image 1101, radio buttons 1102 and 1103, a check box 1104, a save button 1105, and an exit button 1106. The processed image 1101 image is an image formed after the exchange of the left and right images, that is, a processed image generated in step S707. The radio button 1102 is a radio button selected when circular fish-eye display is provided. The radio button 1103 is a radio button selected when equidistant cylinder display is provided. When the radio button 1102 is selected, the radio button 1103 is not selected. When the radio button 1102 is not selected, the radio button 1103 is selected. The check box 1104 and the save button 1105 are display items used when equidistant cylinder display is provided. When the radio button 1102 is selected, the check box 1104 and the save button 1105 are grayed out to disable an operation. The uses of the check box 1104 and the save button 1105 will be described below. The exit button 1106 is a button for terminating the application of the screen 1100.

Equidistant cylinder display will be described below. If it is determined in step S706 of FIG. 7 that circular fish-eye display is not selected and equidistant cylinder display is selected, the process advances to step S710 to display an image in equidistant cylinder display. From among the radio buttons 1102 and 1103 in FIGS. 11A and 11B, for example, when the radio button 1103 is selected, it is determined that circular fish-eye display is not selected but equidistant cylinder display is selected.

In step S710, the control unit 501 of the PC 500 determines whether to make an adjustment (an adjustment of an individual value) using an individual value of dual lenses. If it is determined that an individual value is to be adjusted, the process advances to step S716. Otherwise the process advances to step S711. In step S710, for example, whether to adjust an individual value is determined based on whether the check box 1104 in FIG. 11B has been checked. If the check box 1104 has been checked, it is determined that an individual value is to be adjusted, and then the process advances to step S716. If the check box 1104 has not been checked, the process advances to step S711. Operations after step S716 will be described later.

In step S711, based on center coordinates (the centers of the optical axes of the left-eye optical system 301L and the right-eye optical system 301R) obtained in step S704, the control unit 501 generates a map for the equidistant cylinder transformation. Equidistant cylinder transformation is transformation in which a circular fish-eye image assumed to be a sphere has latitude lines (horizontal lines) and longitude lines (vertical lines) crossing each other at right angles as in equidistant cylindrical projection for a map. Through the equidistant cylinder transformation, the circular fish-eye image is transformed into an equidistant cylindrical image shaped like a rectangle. The map indicates positions in the image before the transformation, the positions corresponding to pixels after the transformation. In the present embodiment, the map for the equidistant cylinder transformation is generated such that the circular fish-eye image can be transformed into an equidistant cylindrical image and the positions of the right image and the left image can be corrected. In step S711, according to the same method as in step S707, the control unit 501 specifies the areas of a right image and a left image in a captured image. And, the control unit 501 generates a map based on the two specified areas.

In step S712, the control unit 501 performs the equidistant cylinder transformation by using the map generated in step S711, thereby generating a processed image. The exchange of the positions of the left and right images is regarded as a part of the equidistant cylinder transformation. The exchange of the positions of the images may be separated from the equidistant cylinder transformation.

In step S713, the control unit 501 displays the processed image, which is generated in step S712 or step S718, on the display unit 506. Step S718 will be described later in another embodiment. For example, a processed image 1111 in FIG. 11B is displayed on the display unit 506.

In step S714, the control unit 501 determines whether to save the processed image (the image after the equidistant cylinder transformation) displayed in step S713. If it is determined that the processed image is to be saved, the process advances to step S715. Otherwise the process advances to step S709. In step S714, for example, whether to save the processed image is determined based on whether the save button 1105 in FIG. 11B has been pressed. If the save button 1105 has been pressed, it is determined that the processed image is to be saved, and the process advances to step S715. If the save button 1105 has not been pressed, the process advances to step S709.

In step S715, the control unit 501 stores, in the recording medium 504, the image file of the processed image (the image after the equidistant cylinder transformation) displayed in step S713.

Figure 12:
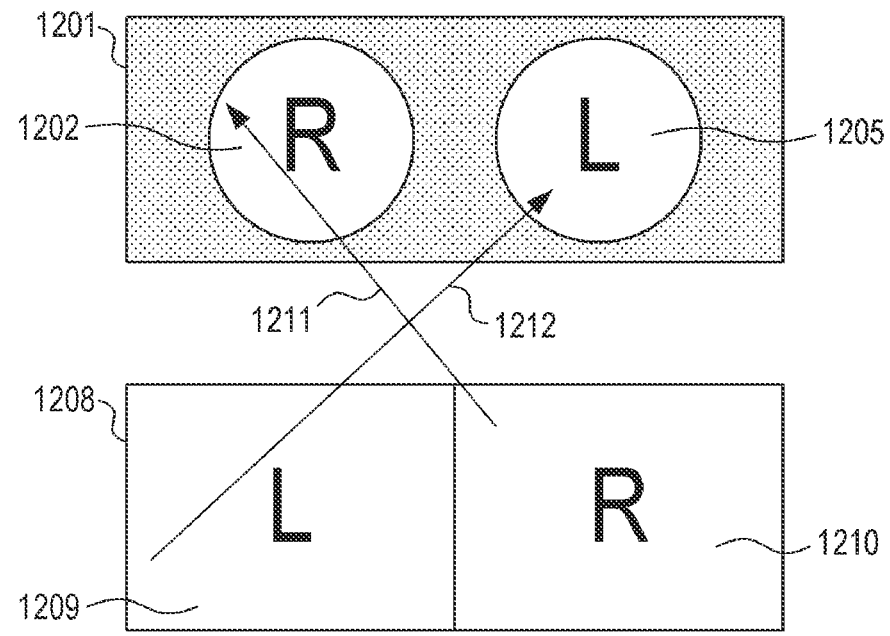
FIG. 12 is a schematic diagram illustrating equidistant cylinder transformation.

FIG. 12 is a schematic diagram illustrating the equidistant cylinder transformation according to the present embodiment. As illustrated in FIG. 12, an image 1201 before the equidistant cylinder transformation includes a right image 1202 disposed as a circular fish-eye image on the left side and a left image 1205 disposed as a circular fish-eye image on the right side. An image 1208 is an image obtained after the equidistant cylinder transformation and includes equidistant cylindrical images 1209 and 1210. In the present embodiment, a map of the equidistant cylinder transformation is generated in a correspondence indicated by arrows 1211 and 1212. In the map of the present embodiment, the pixels of the equidistant cylindrical image 1209 disposed on the left side are associated with positions in the left image 1205 disposed on the right side, whereas the pixels of the equidistant cylindrical image 1210 disposed on the right side are associated with positions in the right image 1202 disposed on the left side. By using this map, the left image 1205 disposed on the right side is transformed into the equidistant cylindrical image 1209 disposed on the left side, and the right image 1202 disposed on the left side is transformed into the equidistant cylindrical image 1210 disposed on the right side. In other words, the positions of the right image and the left image are exchanged while the circular fish-eye images are transformed into the equidistant cylindrical images. This allows the positional relationship between the right image and the left image to agree with the positional relationship between the two optical systems (the right-eye optical system 301R and the left-eye optical system 301L).

FIG. 11B is a schematic diagram illustrating an example of display (display in step S713) on an application screen displayed on the display unit 506 by the control unit 501 after the equidistant cylinder transformation. In FIG. 11A, the processed image 1101, which is an image after the positions of the left and right images are exchanged, is displayed on the screen 1100 (application screen). In FIG. 11B, the processed image 1111 (the processed image generated in step S712 or step S718), which is an image after the equidistant cylinder transformation, is displayed on the screen 1100. In FIG. 11B, the check box 1104 and the save button 1105 are not grayed out, enabling operations on the check box 1104 and the save button 1105. The check box 1104 is checked when an individual value is adjusted. The save button 1105 is pressed when the image file of the processed image 1111 is stored. Since the check box 1104 has not been checked, the processed image generated in step S712 is displayed as the processed image 1111.

In the following example, an individual value is adjusted when equidistant cylinder display is provided. Specifically, operations from step S716 in FIG. 7 will be described below. An individual value of dual lenses may be used also when circular fish-eye display is provided. A detailed explanation is omitted.

In step S716, the control unit 501 adjusts the design value obtained in step S703, based on the individual value obtained in step S703. For example, image circle positions (the center coordinates of the right image and the left image in the captured image) are adjusted based on an image-circle displacement in FIG. 10B. If the individual value is a difference from the design value, the individual value is added to the design value. If the individual value is an absolute value equivalent to the design value, the design value is replaced with the individual value.

Figure 18:
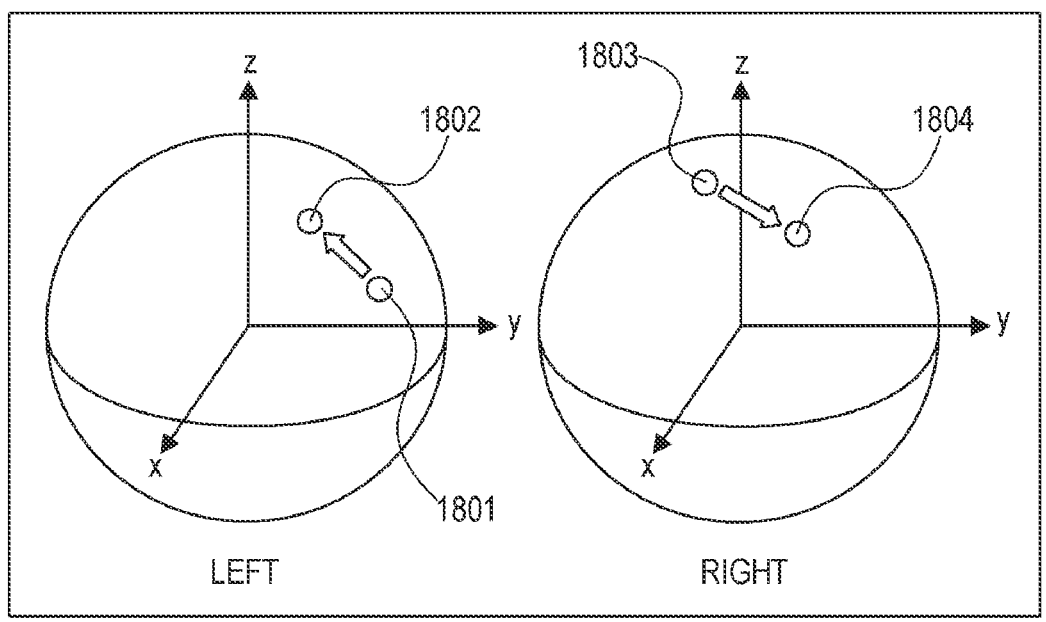
FIG. 18 is a diagram indicating a correction of an image position on space coordinates.

In step S717, based on the adjusted center coordinates (the centers of the optical axes of the left-eye optical system 301L and the right-eye optical system 301R) in step S716, the control unit 501 generates a map for the equidistant cylinder transformation. FIG. 18 illustrates an example in which an image position on space coordinates is adjusted for each pixel based on the adjusted center coordinates (correction for correcting a pixel position). In the left image, an image position is adjusted for each pixel such that an image position 1801 is adjusted to an image position 1802 on the space coordinates. In the right image, an image position is adjusted for each pixel such that an image position 1803 is adjusted to an image position 1804 on the space coordinates. The map is generated by the same method as in step S711. Using the adjusted center coordinates enables the equidistant cylinder transformation with higher accuracy.

In step S718, the control unit 501 performs the equidistant cylinder transformation by using the map generated in step S717, thereby generating a processed image. The processed image is generated by the same method as in step S712. Operations from step S713 are performed as stated above. As described above, the design value of lens information is corrected based on the individual values of dual lenses, thereby transforming a circular fish-eye image into an equidistant cylindrical image with higher accuracy.

According to an information processing apparatus of the present embodiment, if an image is displayed based on an image file captured by dual lenses, left and right images obtained through the optical systems of the dual lenses can be properly placed after the centers of the left and right images are corrected. This can display natural dual-lens images.

Second Embodiment

A second embodiment of the present disclosure will be described below. The present embodiment will describe an example in which a camera 100 and a PC 500 are connected to communicate with each other, a live view image captured by the camera 100 is transmitted to the PC 500, and the PC 500 displays the live view image on a display unit 506.

Figure 13:
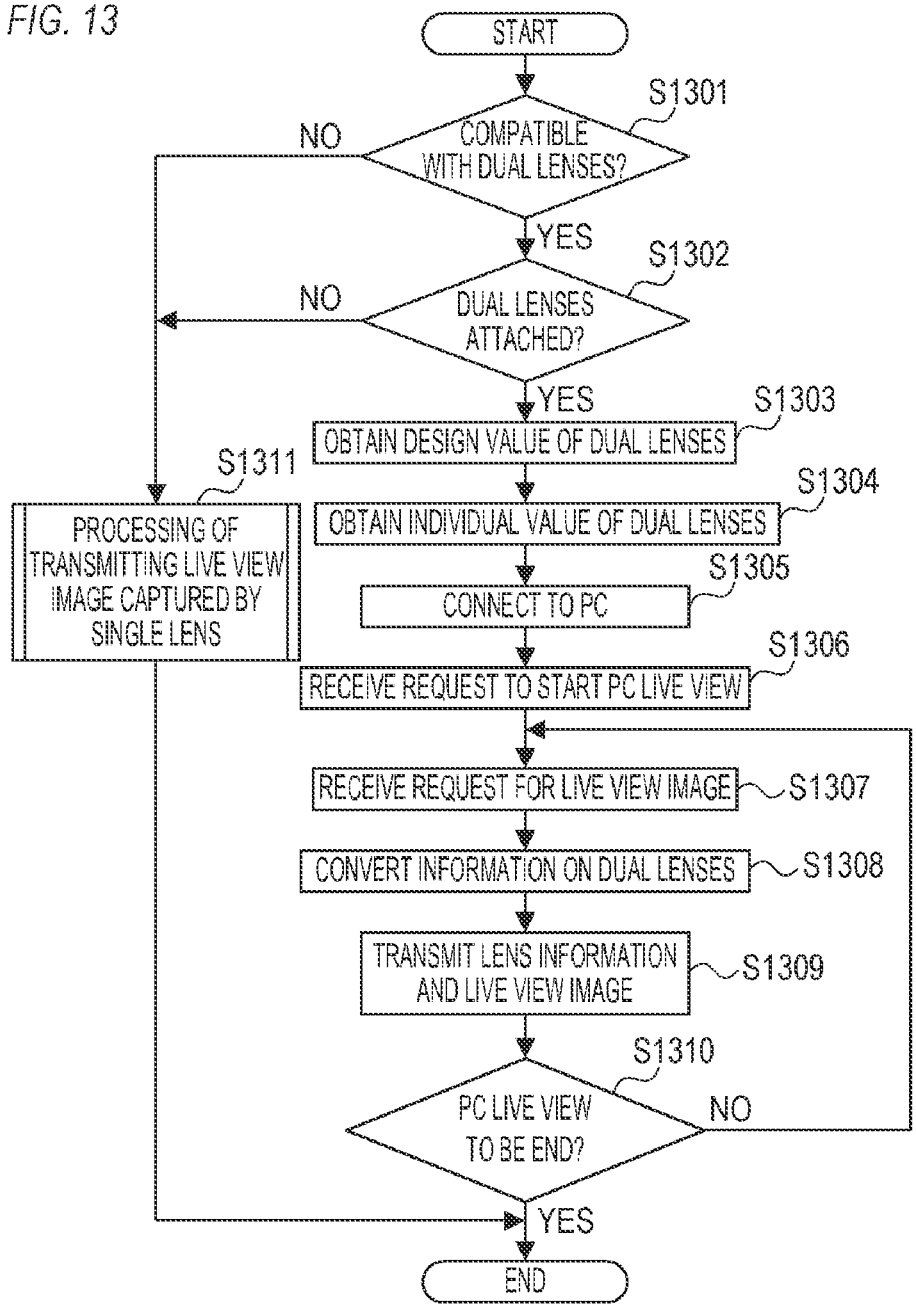
FIG. 13 is a flowchart indicating the operations of the camera.

FIG. 13 is a flowchart indicating an example of operations of the camera 100. These operations are implemented by expanding and running programs, which are recorded in the nonvolatile memory 219, in the system memory 218 by the system control unit 50. For example, when the camera 100 is started, the operations of FIG. 13 are started. The operations of FIG. 13 are operations for the function of displaying a live view image, which is captured by the camera, on the display unit of the PC (PC live view). The operations of FIG. 13 are performed when the camera 100 is placed in a shooting standby state. When an instruction to start recording is inputted from the PC 500 during PC live view, still-image shooting or moving-image shooting is performed. At this point, the PC live view may be continued. The control of shooting using the dual lenses is the process from step S608 to step S613 in FIG. 6, and its description is omitted.

In step S1301, the system control unit 50 determines whether the camera 100 is provided for dual lenses (e.g., the lens unit 300). If it is determined that the version is compatible with dual lenses, the process advances to step S1302. Otherwise the process advances to step S1311. The process of step S1301 is the same as the process of step S601 in FIG. 6.

In step S1302, the system control unit 50 determines whether dual lenses have been attached to the camera 100. If it is determined that dual lenses have been attached, the process advances to step S1303. Otherwise the process advances to step S1311. The process of step S1302 is the same as the process of step S602 in FIG. 6.

In step S1303, the system control unit 50 obtains the design value of attached (connected) dual lenses from the dual lenses. In step S1304, the system control unit 50 obtains the individual value of the attached (connected) dual lenses from the dual lenses. The process of steps S1303 and S1304 is the same as the process of steps S603 and S604.

In step S1305, the camera 100 is connected to the PC 500, and the system control unit 50 detects the connection of the camera 100 to the PC 500. In step S1306, the system control unit 50 receives, from the PC 500, a request to start PC live view. In step S1307, the system control unit 50 receives, from the PC 500, a request for a live view image. The request for a live view image includes information (resolution information) for specifying the resolution of a live view image as will be described later. The system control unit 50 performs the processing of step S1309 so as to transmit a live view image with the specified resolution to the PC 500.

In step S1308, the system control unit 50 converts the information (lens information on dual lenses) obtained in steps S1303 and S1304, according to the coordinate system of the live view image to be transmitted. A captured image (an image recorded in an image file) and a live view image have different resolutions, so that information obtained in steps S1303 and S1304 cannot be used as it is for the image processing of the live view image. Thus, in the present embodiment, lens information is converted into information compliant with the coordinate system of the live view image.

In step S1309, the system control unit 50 transmits, to the PC 500, the lens information converted in step S1308 and the live view image. The system control unit 50 changes the resolution of the live view image based on the resolution information obtained in step S1307 and transmits the live view image to the PC 500. In the present embodiment, the system control unit 50 of the camera 100 converts the lens information. The control unit 501 of the PC 500 may convert the lens information. At this point, the lens information before the conversion and a parameter for converting the lens information are transmitted to the PC 500.

In step S1310, the system control unit 50 determines whether to end PC live view. For example, if the camera 100 and the PC 500 are disconnected from each other or the user instructs the camera 100 or the PC 500 to end PC live view, it is determined that the PC live view is to be ended. If it is determined that the PC live view is to be ended, the operations of FIG. 13 are ended. Otherwise the process advances to step S1307.

If a single lens is attached to the camera 100, the processing of step S1311 is performed. In step S1311, the system control unit 50 transmits, to the PC 500, a live view image captured by a single lens. The processing of step S1311 is identical to conventional processing for transmitting, to external equipment, a live view image captured by a single lens, and thus a detailed explanation thereof is omitted. In the present embodiment, when a live view image captured by a single lens is transmitted to the PC 500, the system control unit 50 does not acquire information (including a design value and an individual value) on the attached single lens from the single lens or transmit the information to the PC 500.

Figure 14:
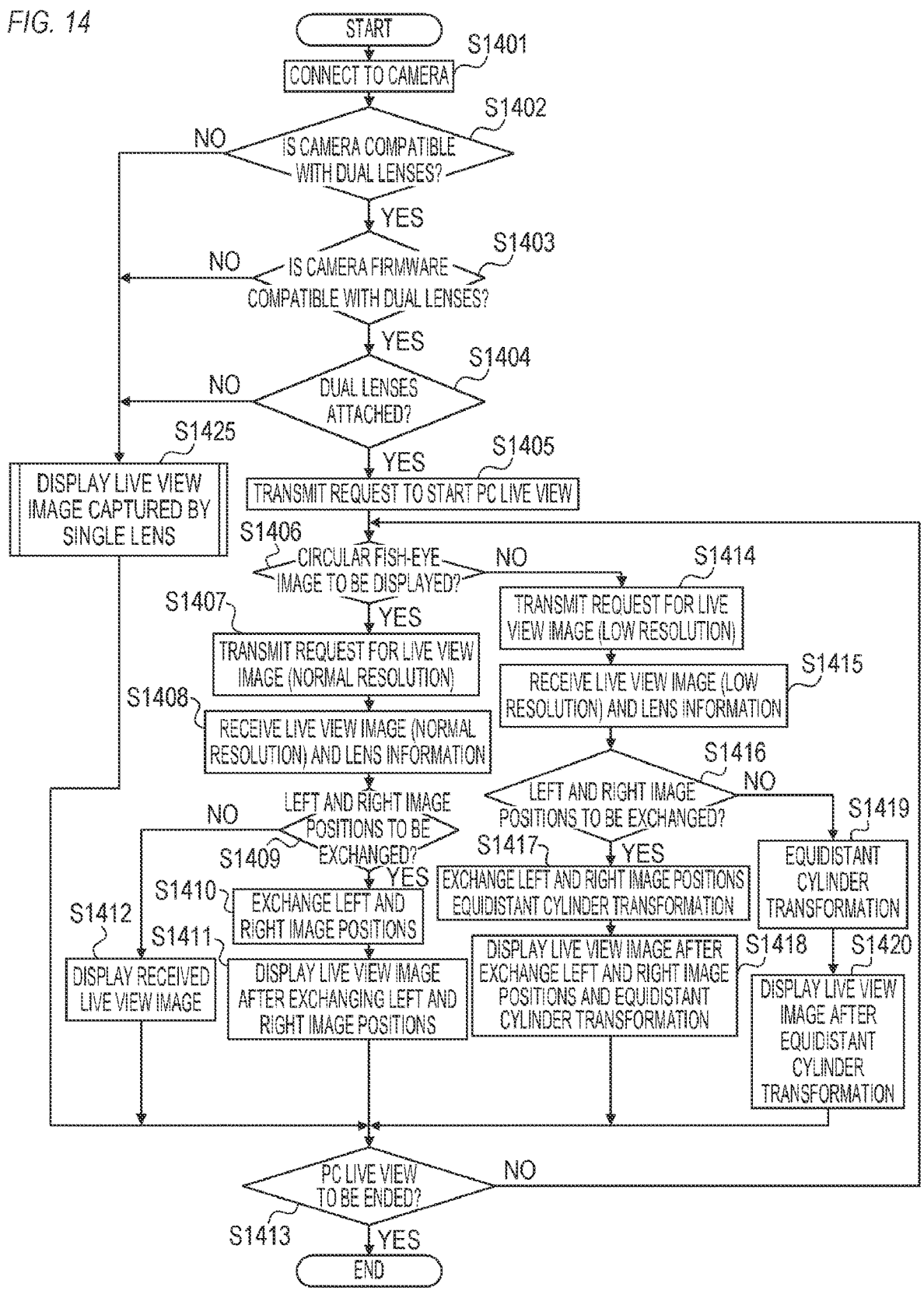
FIG. 14 is a flowchart indicating the operations of the PC.

FIG. 14 is a flowchart indicating an example of the operations of the PC 500. These operations are implemented by expanding and running programs (application programs), which are recorded in the ROM 502, in the RAM 503 by the control unit 501. For example, when the user instructs the PC 500 to start a specific application, the operations of FIG. 14 are started. The operations of FIG. 14 are operations for the function of displaying a live view image, which is captured by the camera, on the display unit of the PC (PC live view).

In step S1401, the camera (e.g., the camera 100) is connected to the PC 500, and the control unit 501 detects the connection of the camera to the PC 500.

In step S1402, the control unit 501 determines whether the camera connected in step S1401 is compatible with dual lenses (e.g., the lens unit 300). For example, the control unit 501 acquires model information on the camera from the connected camera and determines whether the camera is compatible with dual lenses based on the acquired model information. If it is determined that the camera is compatible with dual lenses, the process advances to step S1403. Otherwise the process advances to step S1421. The camera compatible with dual lenses is, for example, a camera to which dual lenses can be attached.

In step S1403, the control unit 501 determines whether the firmware of the camera connected in step S1401 is compatible with dual lenses. For example, the control unit 501 acquires version information on the firmware of the camera from the connected camera and determines whether the version of the firmware of the connected camera is compatible with dual lenses based on the acquired information. If it is determined that the firmware is compatible with dual lenses, the process advances to step S1404. Otherwise the process advances to step S1421.

Even if the camera compatible with dual lenses is connected to the PC 500, the connected camera may become incompatible with dual lenses because of an old firmware version of the connected camera. Thus, the processing of step S1403 is performed. Since various cameras are connectable to the PC 500, cameras incompatible with dual lenses may be connected to the PC 500 regardless of the version of the firmware. Thus, the processing of step S1402 is performed before the processing of step S1403.

In step S1404, the control unit 501 determines whether dual lenses have been attached to the camera connected in step S1401. If it is determined that dual lenses have been attached, the process advances to step S1405. Otherwise the process advances to step S1421.

In step S1405, the control unit 501 transmits a request to start PC live view to the camera connected in step S1401.

Figure 15A:
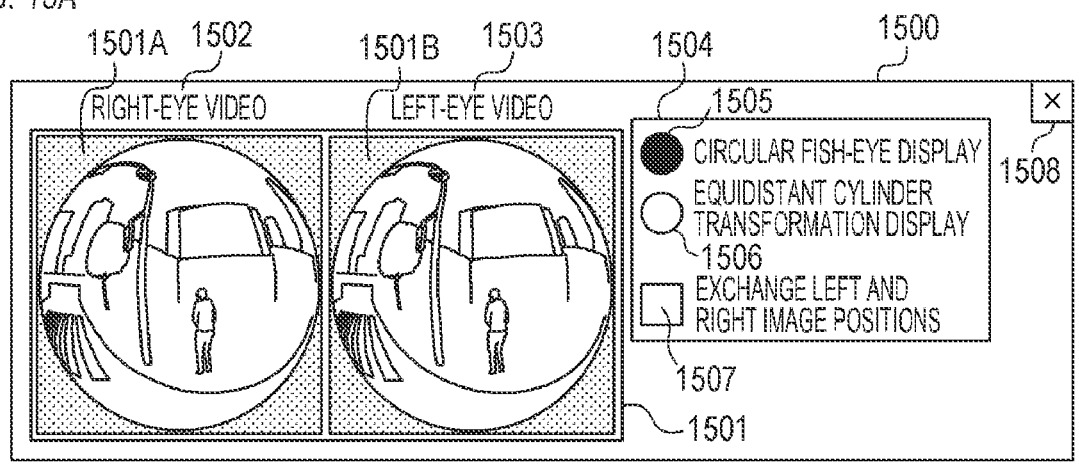
FIGS. 15A to 15D are schematic diagrams of a display screen.

In step S1406, the control unit 501 determines whether to provide circular fish-eye display. If it is determined that circular fish-eye display is to be provided, the process advances to step S1407. Otherwise (if equidistant cylindrical display is provided) the process advances to step S1414. In step S1406, for example, whether to provide circular fish-eye display is determined depending upon whether a radio button 1505 in FIGS. 15A to 15D is selected or not. In FIGS. 15A and 15C, the radio button 1505 is selected, whereas in FIGS. 15B and 15D, the radio button 1505 is not selected. If the radio button 1505 is selected, it is determined that circular fish-eye display is to be provided, and then the process advances to step S1407. If the radio button 1505 is not selected, the process advances to step S1414.

In step S1407, the control unit 501 transmits a request for a live view image to the camera connected in step S1401. In the present embodiment, the request for a live view image in step S1407 is a request for a live view image having a normal resolution. The normal resolution is, for example, 4K resolution.

In step S1408, the control unit 501 receives, from the camera connected in step S1401, a live view image captured by the camera and lens information on dual lenses attached to the camera. The resolution of the live view image received in step S1408 is the normal resolution. The lens information received in step S1408 is information converted according to the received live view image (for example, the lens information converted in step S1308 of FIG. 13).

In step S1409, the control unit 501 determines whether to exchange the positions of a right image and a left image. If it is determined that the positions of the left and right images are to be exchanged, the process advances to step S1410. Otherwise the process advances to step S1412. In step S1409, for example, whether to exchange the positions of the left and right images is determined based on whether a check box 1507 in FIGS. 15A and 15C has been checked. If the check box 1507 has been checked, it is determined that the positions of the left and right images are to be exchanged, and then the process advances to step S1410. If the check box 1507 has not been checked, the process advances to step S1412.

In step S1410, based on the lens information obtained in step S1408, the control unit 501 exchanges the positions of a right image and a left image in the live view image obtained in step S1408 and generates a processed live-view image (the positions of the left and right images have been exchanged). A method for exchanging the positions of the left and right images is the same as that of step S707 in FIG. 7. Based on center coordinates (the centers of the optical axes of the left-eye optical system 301L and the right-eye optical system 301R) included in the lens information received with the live view image, the control unit 501 exchanges the positions of the right image and the left image in the live view image and generates a processed live-view image.

In step S1411, the control unit 501 displays the processed live-view image, which is generated in step S1410, on the display unit 506.

In step S1412, the control unit 501 displays the live-view image, which is obtained in step S1408, on the display unit 506.

In step S1413, the control unit 501 determines whether to end PC live view. For example, if the camera 100 and the PC 500 are disconnected from each other or the user instructs the camera 100 or the PC 500 to end PC live view, it is determined that the PC live view is to be ended. The instruction to end PC live view is, for example, a press to an exit button 1508 in FIGS. 15A to 15D. If it is determined that the PC live view is to be ended, the operations of FIG. 14 are ended. Otherwise the process advances to step S1406.

As described above, if equidistant cylindrical display is provided, the process advances from step S1406 to step S1414. In step S1414, the control unit 501 transmits a request for a live view image to the camera connected in step S1401. In the present embodiment, the request for a live view image in step S1414 is a request for a live view image having a low resolution (lower than the normal resolution). In the case of equidistant cylindrical display, the equidistant cylinder transformation (transformation from a circular fisheye image to an equidistant cylindrical image) is performed. The higher the resolution of an image to be subjected to the equidistant cylinder transformation, the long the time for the equidistant cylinder transformation. This increases a delay by the equidistant cylinder transformation. In the present embodiment, a live view image with a low resolution is requested to increase the speed of the equidistant cylinder transformation (shorten the time for the equidistant cylinder transformation). If the equidistant cylinder transformation causes a delay within tolerance, a live view image with a normal resolution may be requested in equidistant cylindrical display.

In step S1415, the control unit 501 receives, from the camera connected in step S1401, a live view image captured by the camera and lens information on dual lenses attached to the camera. The resolution of the live view image received in step S1415 is the low resolution. The lens information received in step S1415 is information converted according to the received live view image (for example, the lens information converted in step S1308 of FIG. 13).

In step S1416, the control unit 501 determines whether to exchange the positions of a right image and a left image. If it is determined that the positions of the left and right images are to be exchanged, the process advances to step S1417. Otherwise the process advances to step S1419. In step S1416, for example, whether to exchange the positions of the left and right images is determined based on whether a check box 1507 in FIGS. 15B and 15D has been checked. If the check box 1507 has been checked, it is determined that the positions of the left and right images are to be exchanged, and then the process advances to step S1417. If the check box 1507 has not been checked, the process advances to step S1419.

In step S1417, based on the lens information obtained in step S1415, the control unit 501 exchanges the positions of the right image and the left image in the live view image obtained in step S1415 and transforms each of the left and right images into an equidistant cylindrical image. In other words, the control unit 501 exchanges the positions of the right and left images and performs the equidistant cylinder transformation, thereby generating a processed live view image. The transformation into equidistant cylinder display including the exchange of the positions of the left and right images is similar to step S712. The transformation into equidistant cylinder display including the exchange of the positions of the left and right images may be similar to steps S716 to S718. In other words, the control unit 501 may generate a map based on a lens design value corrected by using individual values included in the lens information received with the live view image, and perform, based on the map, the transformation into equidistant cylinder display including the exchange of the positions of the left and right images. As in the first embodiment, the exchange of the positions of the left and right images may be performed as part of the equidistant cylinder transformation or may be performed as different processing.

In step S1418, the control unit 501 displays the processed live-view image, which is generated in step S1417, on the display unit 506.

In step S1419, the control unit 501 does not exchange the positions of the right image and the left image in the live view image obtained in step S1415 but transforms each of the left and right images into an equidistant cylindrical image. In other words, the control unit 501 generates a processed live-view image by the equidistant cylinder transformation without exchanging the positions of the left and right images.

In step S1420, the control unit 501 displays the processed live-view image, which is generated in step S1419, on the display unit 506.

If the camera 100 is not compatible with dual lenses or a single lens is attached to the camera 100, the processing of step S1421 is performed. In step S1421, the control unit 501 displays, on the display unit 506, a live view image captured by a single lens. The processing of step S1421 is identical to conventional processing in which a PC or the like displays a live view image captured by a single lens, and thus a detailed explanation thereof is omitted.

In steps S1410, S1417, and S1419, the control unit 501 performs image processing on a live view image acquired from the connected camera. In step S1413 subsequent to steps S1410, S1417, and S1419, the control unit 501 determines whether to end PC live view. If the PC live view is continued, the processing is returned to step S1406 preceding steps S1410, S1417, and S1419. Thus, in the operations of FIG. 14, image processing in any one of steps S1410, S1417, and S1419 may be repeatedly performed.

In order to enhance the speed of image processing, the control unit 501 may record, in the RAM 503, information related to performed image processing and use the information from subsequent image processing. For example, the control unit 501 records a correspondence (image processing map) between a pixel before image processing and a pixel after image processing. The image processing map can be continuously used unless the resolution of a live view image or the lens information changes. When image processing in any one of steps S1410, S1417, and S1419 is performed, the control unit 501 records an image processing map for the image processing. When the same image processing is performed again, the control unit 501 performs the image processing using the recorded image processing map. This can increase the speed of the image processing.

FIGS. 15A to 15D are schematic diagrams illustrating an example of display (PC live view display) on an application screen displayed on the display unit 506 by the control unit 501. A screen 1500 is the application screen (remote live view screen). The screen 1500 includes a live-view display area 1501, a guide display area 1502, a guide display area 1503, an operation area 1504, and the exit button 1508.

The live-view display area 1501 is an area for displaying a live view image. The live-view display area 1501 includes a left-side display area 1501A and a right-side display area 1501B. The guide display area 1502 is an area for displaying character strings indicating which one of the two optical systems (the left-eye optical system 301L and the right-eye optical system 301R) of dual lenses displays an image in the left-side display area 1501A. The guide display area 1503 is an area for displaying character strings indicating which one of the two optical systems (the left-eye optical system 301L and the right-eye optical system 301R) of dual lenses displays an image in the right-side display area 1501B. The operation area 1504 is an area for receiving an operation for PC live view. The operation area 1504 displays the radio button 1505, a radio button 1506, and the check box 1507. The radio button 1505 is a radio button selected when circular fish-eye display is provided. The radio button 1506 is a radio button selected when equidistant cylinder display is provided. When the radio button 1505 is selected, the radio button 1506 is not selected. When the radio button 1505 is not selected, the radio button 1506 is selected. The check box 1507 is a box to be checked when the positions of left and right images are exchanged. When the check box 1507 is operated, the positions of a right image (right-eye video) and a left image (left-eye video) in a live view image are exchanged while the character strings displayed in the guide display areas 1502 and 1503 are also exchanged with each other. The exit button 1508 is a button for terminating PC live view.

In FIG. 15A, the radio button 1505 for providing circular fish-eye display is selected. The check box 1507 for exchanging the positions of left and right images is not checked. Thus, a live view image obtained from the camera is displayed as it is in the live-view display area 1501. Specifically, right-eye video is displayed as a circular fish-eye image in the left-side display area 1501A while left-eye video is displayed as a circular fish-eye image in the right-side display area 1501B.

Figure 15B:
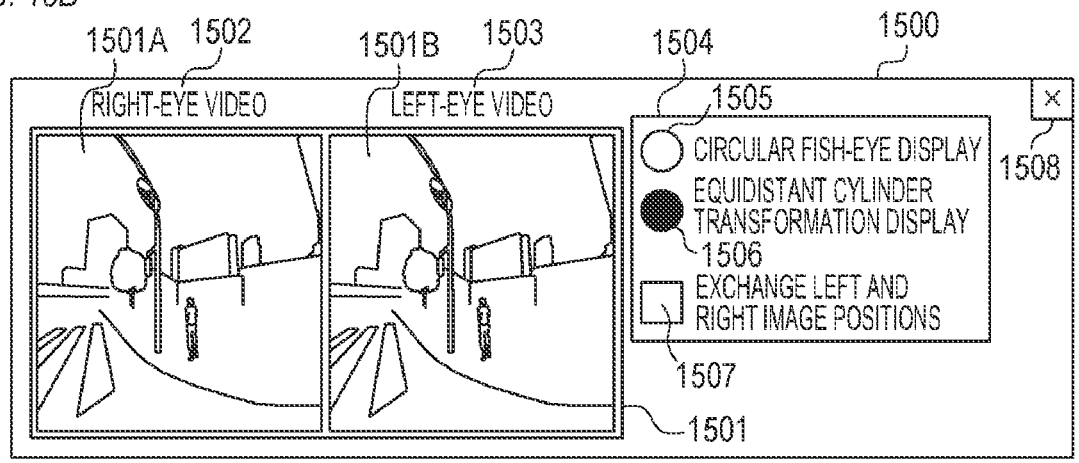
Figure 15C:
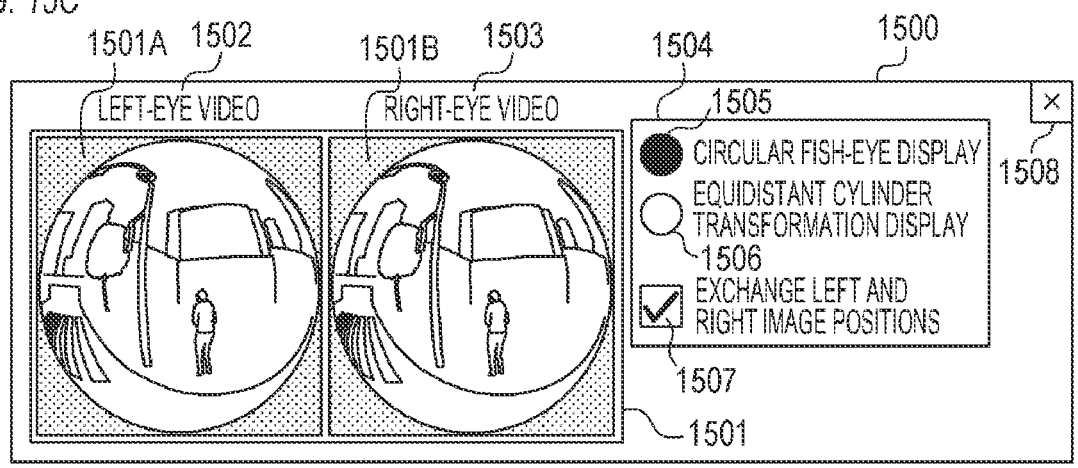

In FIG. 15B, the radio button 1506 for providing equidistant cylinder display is selected. The check box 1507 for exchanging the positions of left and right images is not checked. Thus, the right-eye video and the left-eye video (circular fish-eye images) in the live view image obtained from the camera are each transformed into an equidistant cylindrical image (the positions of the images are not exchanged). Thereafter, the live-view display area 1501 displays the live view image obtained after the transformation into an equidistant cylindrical image. Specifically, right-eye video is displayed as an equidistant cylindrical image in the left-side display area 1501A while left-eye video is displayed as an equidistant cylindrical image in the right-side display area 1501B.

In FIG. 15C, the radio button 1505 for providing circular fish-eye display is selected, and the check box 1507 for exchanging the left and right images is checked. Thus, the positions of the right-eye video and the left-eye video in the live view image obtained from the camera are exchanged. Thereafter, the live-view display area 1501 displays the live view image obtained after the positions are exchanged. Specifically, left-eye video is displayed as a circular fish-eye image in the left-side display area 1501A while right-eye video is displayed as a circular fish-eye image in the right-side display area 1501B.

Figure 15D:
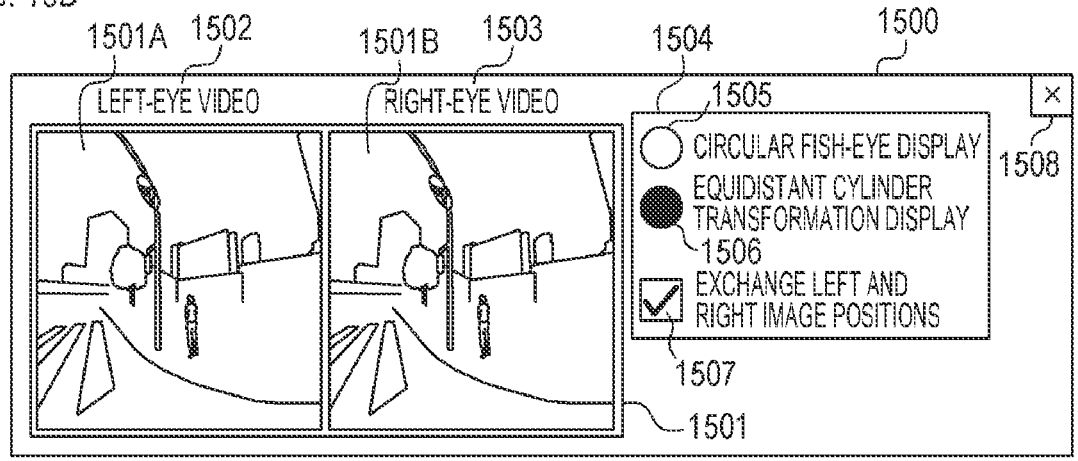

In FIG. 15D, the radio button 1506 for providing equidistant cylinder display is selected, and the check box 1507 for exchanging the left and right images is checked. Thus, the positions of the right-eye video and the left-eye video in the live view image obtained from the camera are exchanged, and the right-eye video and the left-eye video (circular fish-eye images) are each transformed into an equidistant cylindrical image. Thereafter, the live-view display area 1501 displays the live view image obtained after the exchange of the left and right images and the transformation into an equidistant cylindrical image. Specifically, left-eye video is displayed as an equidistant cylindrical image in the left-side display area 1501A while right-eye video is displayed as an equidistant cylindrical image in the right-side display area 1501B.

The various kinds of control to be performed by the system control unit 50 may be performed by a piece of hardware, or processing may be shared among pieces of hardware (e.g., a plurality of processors or circuits) to control the overall device. Likewise, the various kinds of control to be performed by the control unit 501 may be performed by a piece of hardware or processing may be shared among pieces of hardware (e.g., a plurality of processors or circuits) to control the overall device.

The present disclosure was specifically described in accordance with the exemplary embodiments. The present disclosure is not limited to these specific embodiments. The present disclosure includes various modes without departing from the scope of the disclosure. Each of the foregoing embodiments merely illustrates an embodiment of the present disclosure, and the embodiments can be combined as necessary.

The present disclosure is not limited to a camera or a PC. The present disclosure is applicable to any electronic apparatuses capable of handling two images with a parallax. For example, the present disclosure is applicable to a PDA, a mobile-phone unit or a portable image viewer, a printer, a digital photo frame, a music player, a video game machine, and an electronic book reader. The present disclosure is further applicable to, for example, a video player, a display device (including a projector), a tablet, a smartphone, an AI speaker, a home electrical appliance, and an on-board unit.

The present disclosure can provide display such that the positions of two images captured by a lens unit having two optical systems are aligned with the two optical systems.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-090861, filed on May 31, 2021, and Japanese Patent Application No. 2022-034311, filed on Mar. 7, 2022, which are hereby incorporated by reference herein in their entirety.

What is claimed is:

1. An information processing apparatus comprising:
a processor; and
a memory storing a program which, when executed by the processor, causes the information processing apparatus to:
obtain an image and correction information, the image including a first image inputted via a first optical system and second image inputted via a second optical system having a predetermined parallax with respect to the first optical system and the correction information including a first parameter in design for a lens unit including the first optical system and the second optical system, and a second parameter intrinsic to the lens unit,
specify a first area in the image corresponding to the first image based on a center of an optical axis of the first optical system in the image of the first parameter,
specify a second area in the image corresponding to the second image based on a center of an optical axis of the second optical system in the image of the first parameter,
transform each of the first area and the second area into an equidistant-cylindrical area based on the first parameter which is corrected by the second parameter,
invert positions of the first area and the second area in the image, and
generate a processed image in which includes the transformed and inverted first area and second area.

2. The information processing apparatus according to claim 1, wherein
the image is an image in which the first area and the second area are horizontally placed side by side, and
the position of the first area and the second area in the image are horizontally inverted.

3. The information processing apparatus according to claim 1, wherein
the first optical system and the second optical system are fish-eye lenses, and
the first area and the second area to be specified are circular fish-eye areas.

4. The information processing apparatus according to claim 1, wherein a file in which the correction information is added as metadata to data on the image, is obtained.

5. The information processing apparatus according to claim 1, wherein
the image is a live view image outputted from an imaging apparatus connectable to the lens unit, and
the correction information is lens information obtained from the lens unit by the imaging apparatus.

6. The information processing apparatus according to claim 1, wherein
the image is an image captured by an imaging apparatus connectable to the lens unit and
the correction information is lens information that is obtained from the lens unit by the imaging apparatus and is added as metadata to data on the image by the imaging apparatus.

7. A control method of an information processing apparatus, comprising:
obtaining an image and correction information, the image including a first image inputted via a first optical system and a second image inputted via a second optical system having a predetermined parallax with respect to the first optical system and the correction information including a first parameter in design for a lens unit including the first optical system and the second optical system, and a second parameter intrinsic to the lens unit;
specifying a first area in the image corresponding to the first image based on a center of an optical axis of the first optical system in the image of the first parameter;
specifying a second area in the image corresponding to the second image based on a center of an optical axis of the second optical system in the image of the first parameter;
transforming each of the first area and the second area into an equidistant-cylindrical area based on the first parameter which is corrected by the second parameter;
inverting positions of the first area and the second area in the image; and
generating a processed image in which includes the transformed and inverted first area and second area.

8. The control method according to claim 7, wherein
the first optical system and the second optical system are fish-eye lenses, and
the first area and the second area to be specified are circular fish-eye areas.

9. The control method according to claim 7, wherein a file in which the correction information is added as metadata to data on the image, is obtained.

10. A non-transitory computer readable medium that stores a program, wherein the program causes a computer to execute a control method of an information processing apparatus, the control method comprising:
obtaining an image and correction information, the image including a first image inputted via a first optical system and a second image inputted via a second optical system having a predetermined parallax with respect to the first optical system and the correction information including a first parameter in design for a lens unit including the first optical system and the second optical system, and a second parameter intrinsic to the lens unit;
specifying a first area in the image corresponding to the first image based on a center of an optical axis of the first optical system in the image of the first parameter;
specifying a second area in the image corresponding to the second image based on a center of an optical axis of the second optical system in the image of the first parameter;
transforming each of the first area and the second area into an equidistant-cylindrical area based on the first parameter which is corrected by the second parameter;
inverting positions of the first area and the second area in the image; and
generating a processed image in which includes the transformed and inverted first area and second area.

11. The non-transitory computer readable medium according to claim 10, wherein
the first optical system and the second optical system are fish-eye lenses, and
the first area and the second area to be specified are circular fish-eye areas.

12. The non-transitory computer readable medium according to claim 10, wherein a file in which the correction information is added as metadata to data on the image, is obtained.

13. The information processing apparatus according to claim 6, wherein the first area and the second area in the image are not specified and the positions of the first area and the second area in the image are not inverted, if the image is not the image captured by the imaging apparatus with the lens unit including the first optical system and the second optical system.

14. The information processing apparatus according to claim 1, wherein the program which, when executed by the processor, further causes the information processing apparatus to perform control to display the processed image on a screen.

15. The information processing apparatus according to claim 1, wherein the program which, when executed by the processor, further causes the information processing apparatus to perform control to display an inverted image including the first area and the second area in the image which of the positions are inverted without transforming each of the first area and the second area into the equidistant-cylindrical area, on a screen, if a predetermined mode is selected by a user.

16. The information processing apparatus according to claim 15, wherein the inverted image includes the first area and the second area which are arranged based on a distance between a left end of the image and a left end of the first area, a distance between center of the image and a right end of the first area, a distance between a right end of the image and a right end of the second area, and a distance between center of the image and a left end of the second area which are calculated using the correction information.

* * * * *